July 6, 1943.   J. KUCHAR   2,323,404
MATERIAL HANDLING AND LOADING APPARATUS
Filed July 2, 1941   16 Sheets-Sheet 2
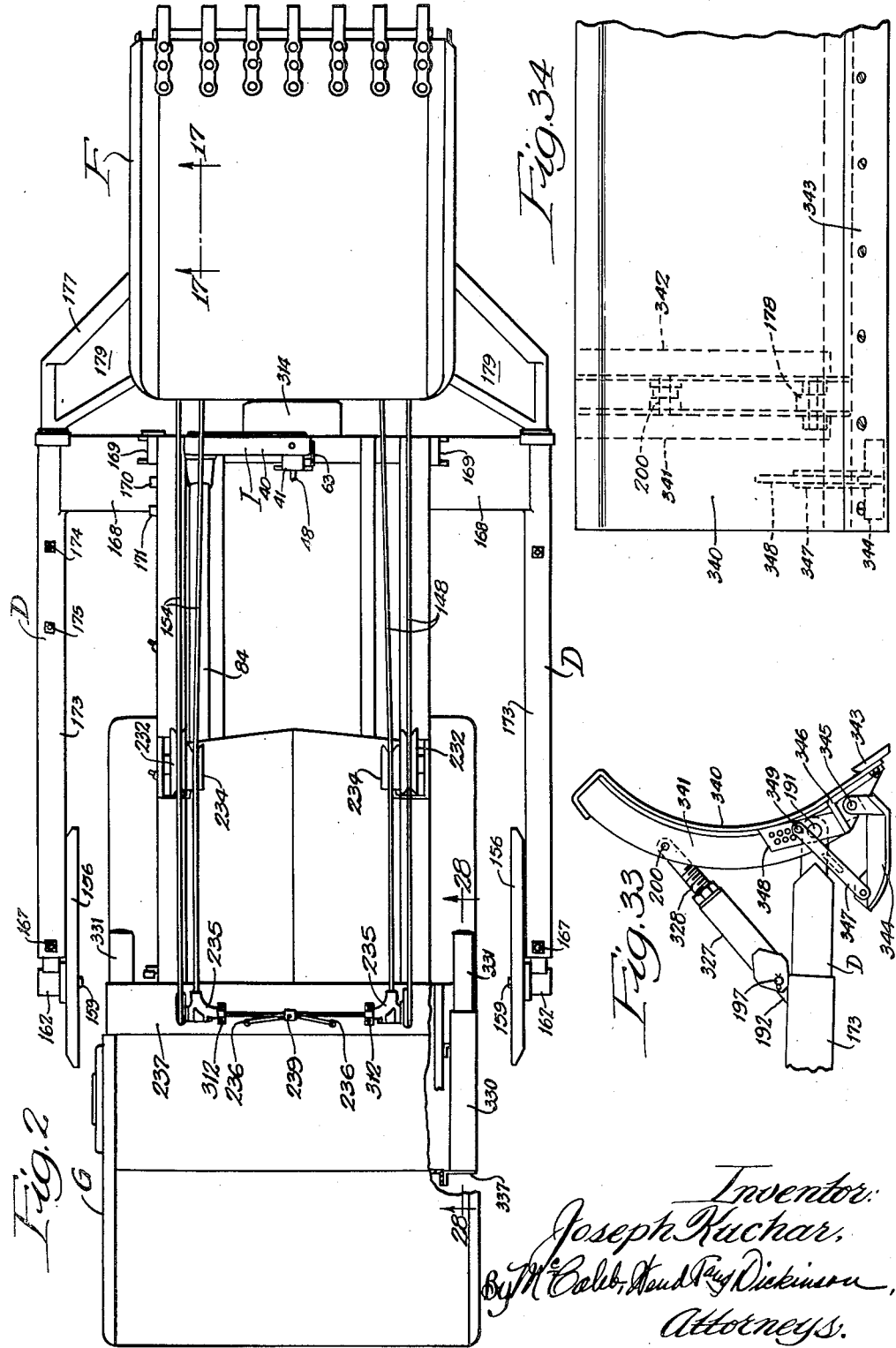
Inventor:
Joseph Kuchar,
By McCaleb, Heard and Ray Dickinson,
Attorneys.

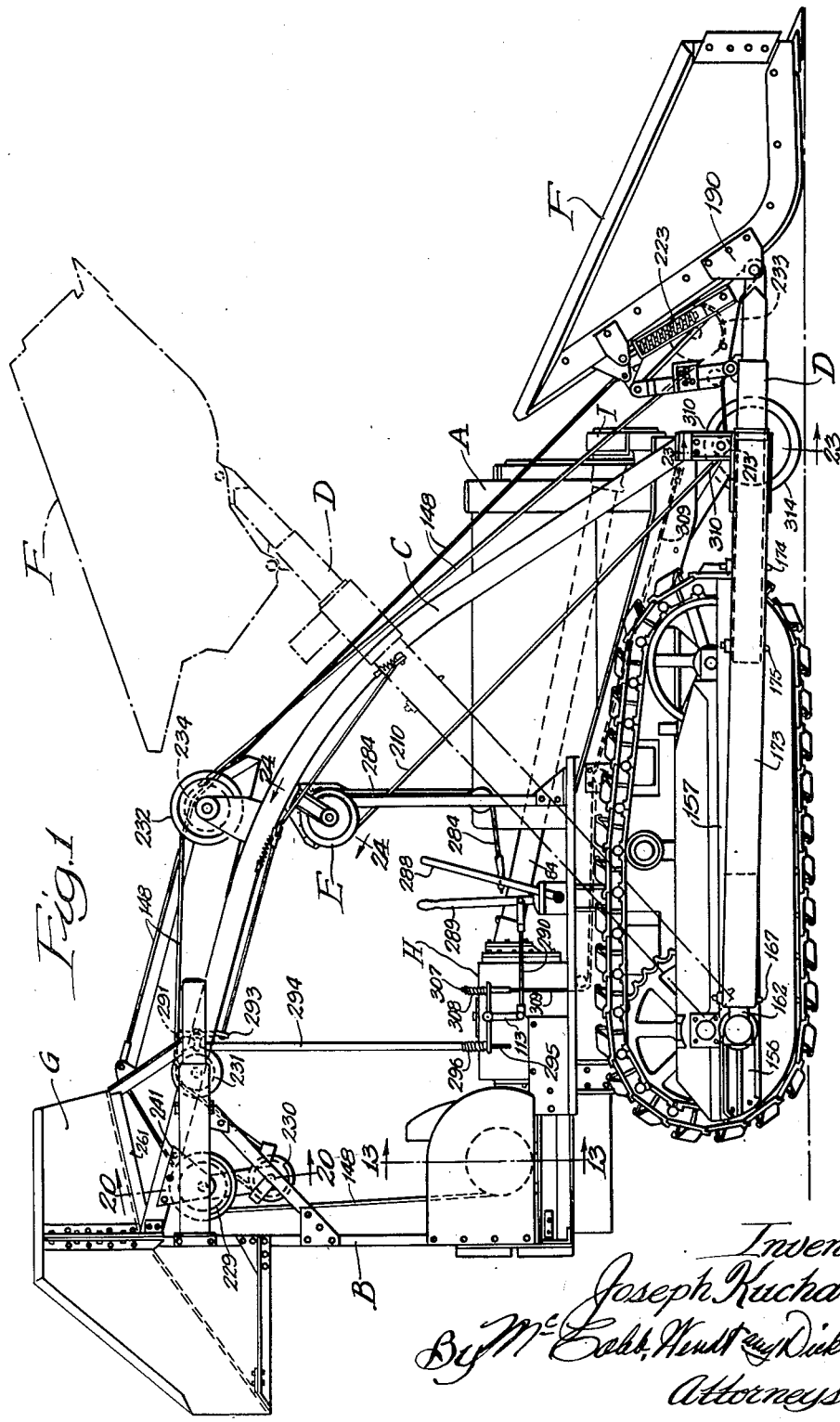

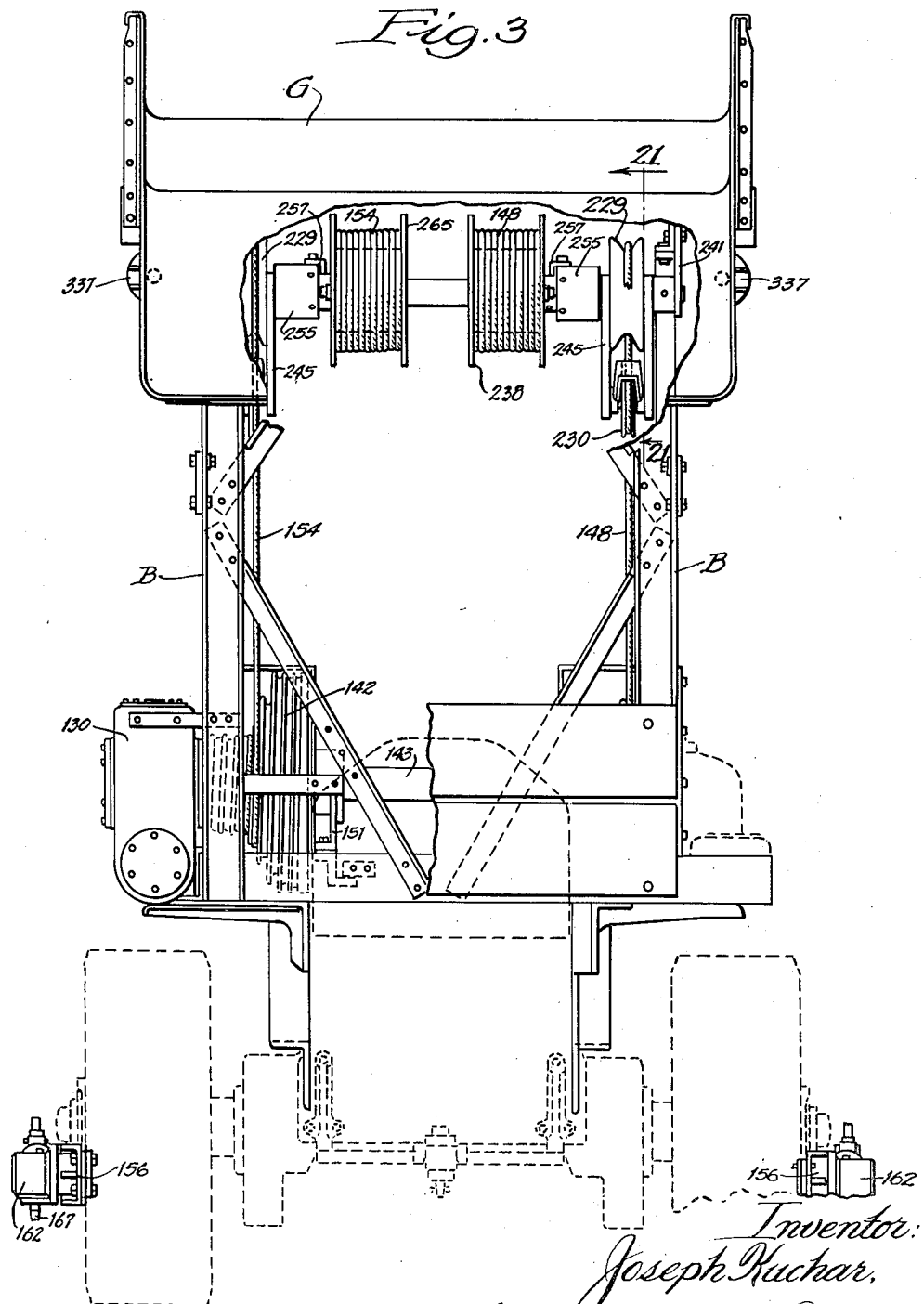

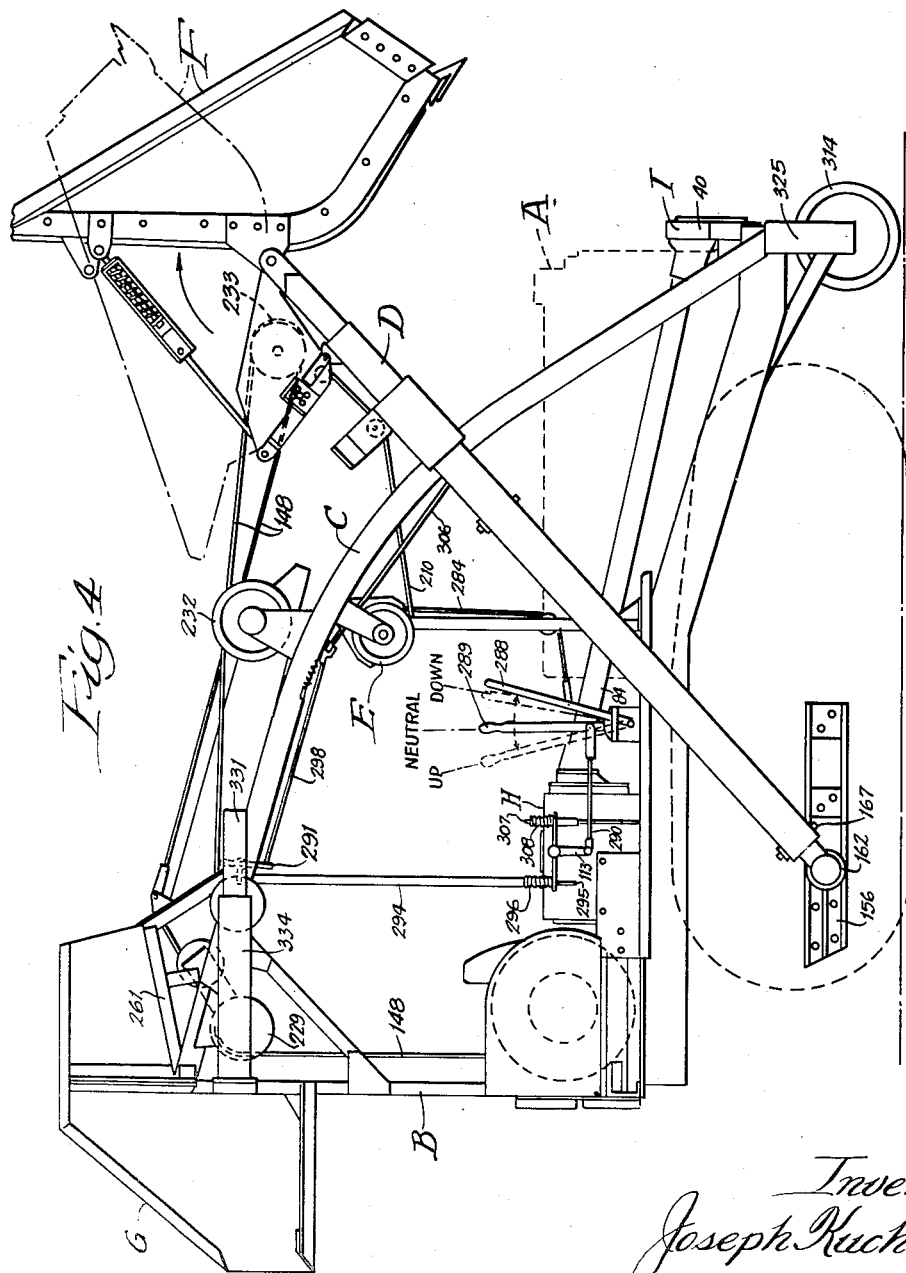

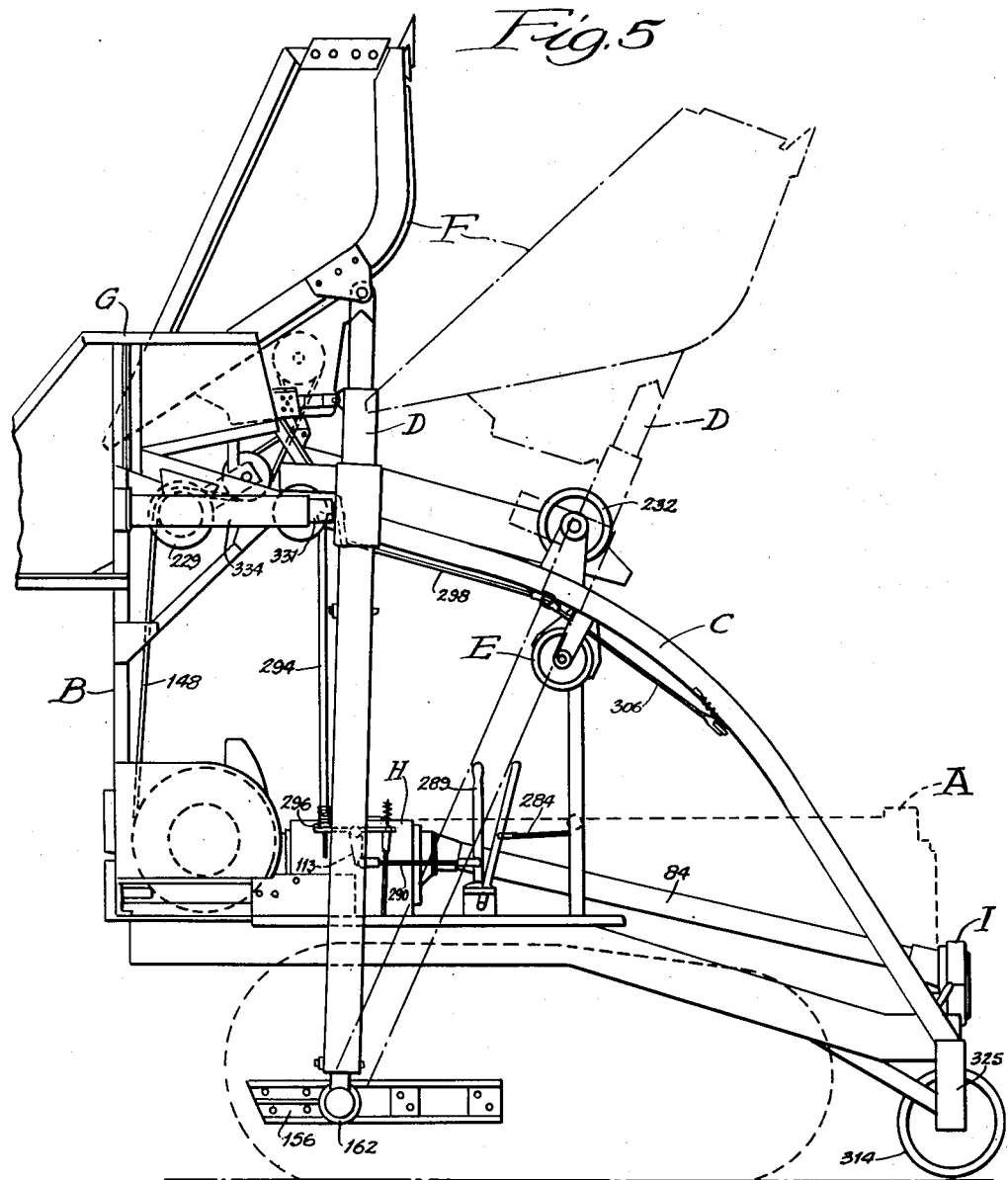

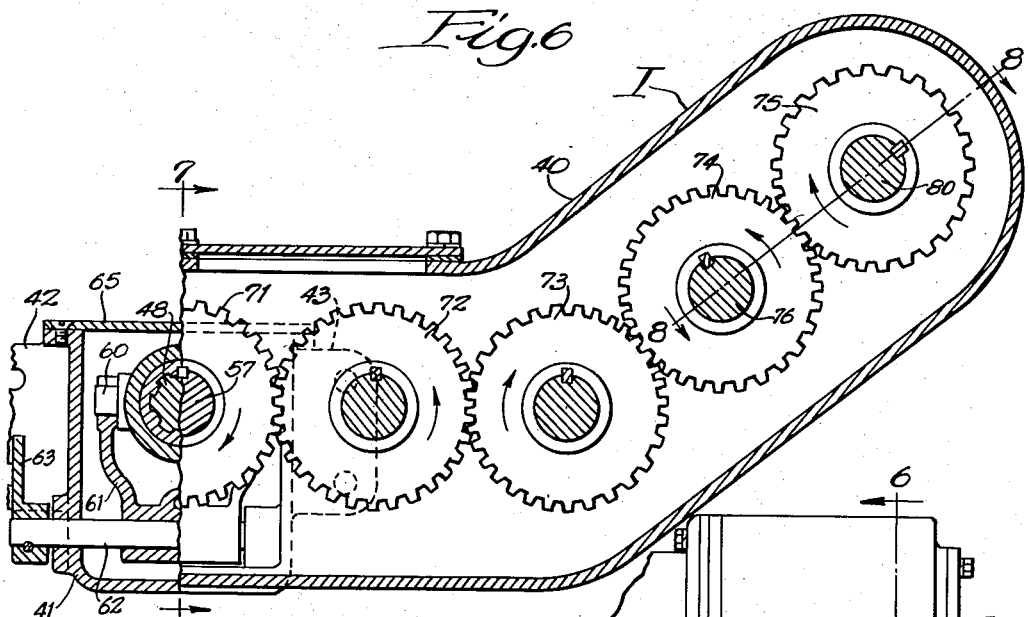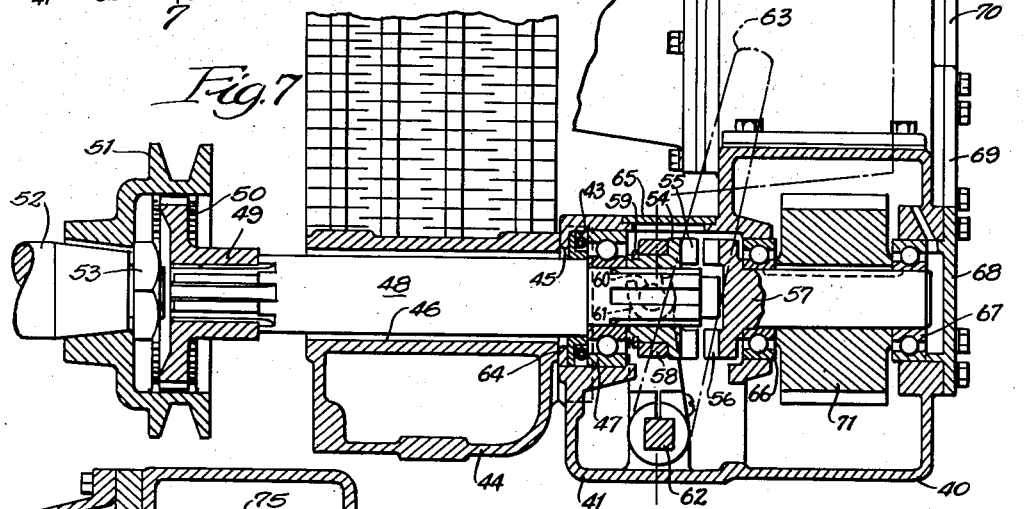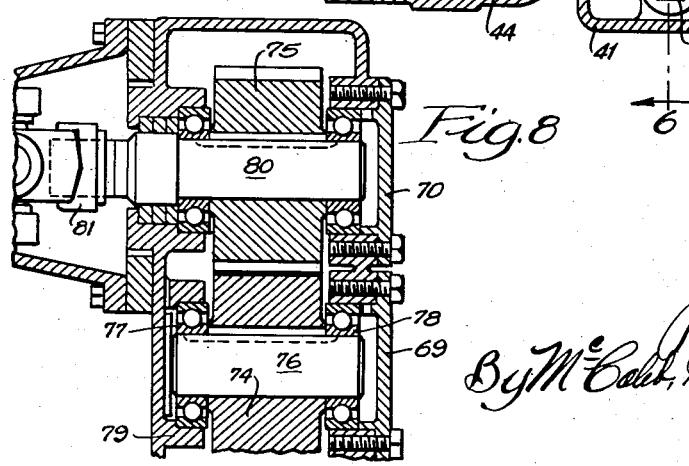

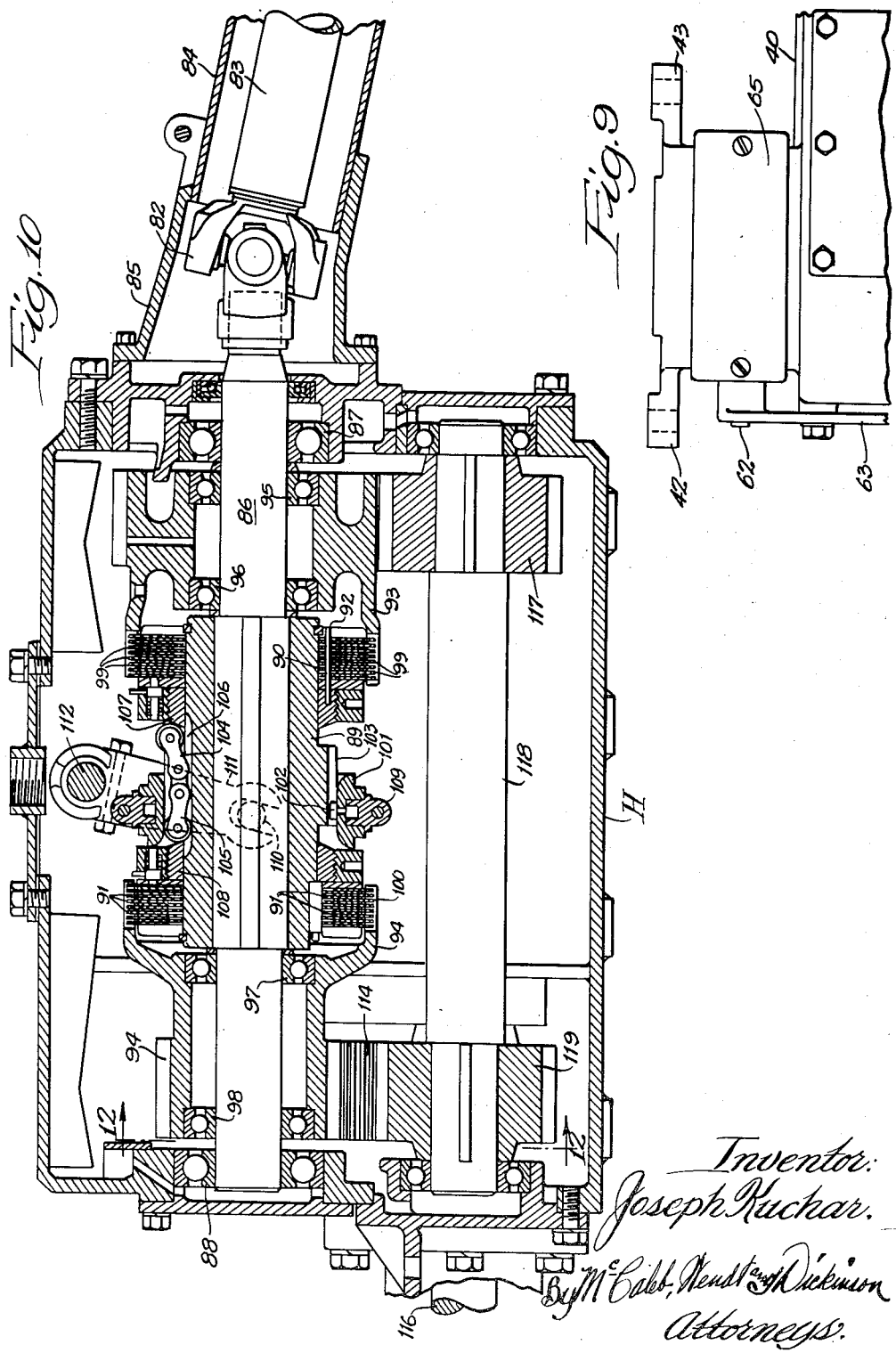
July 6, 1943.  J. KUCHAR  2,323,404
MATERIAL HANDLING AND LOADING APPARATUS
Filed July 2, 1941  16 Sheets-Sheet 7

July 6, 1943. J. KUCHAR 2,323,404
MATERIAL HANDLING AND LOADING APPARATUS
Filed July 2, 1941 16 Sheets-Sheet 9
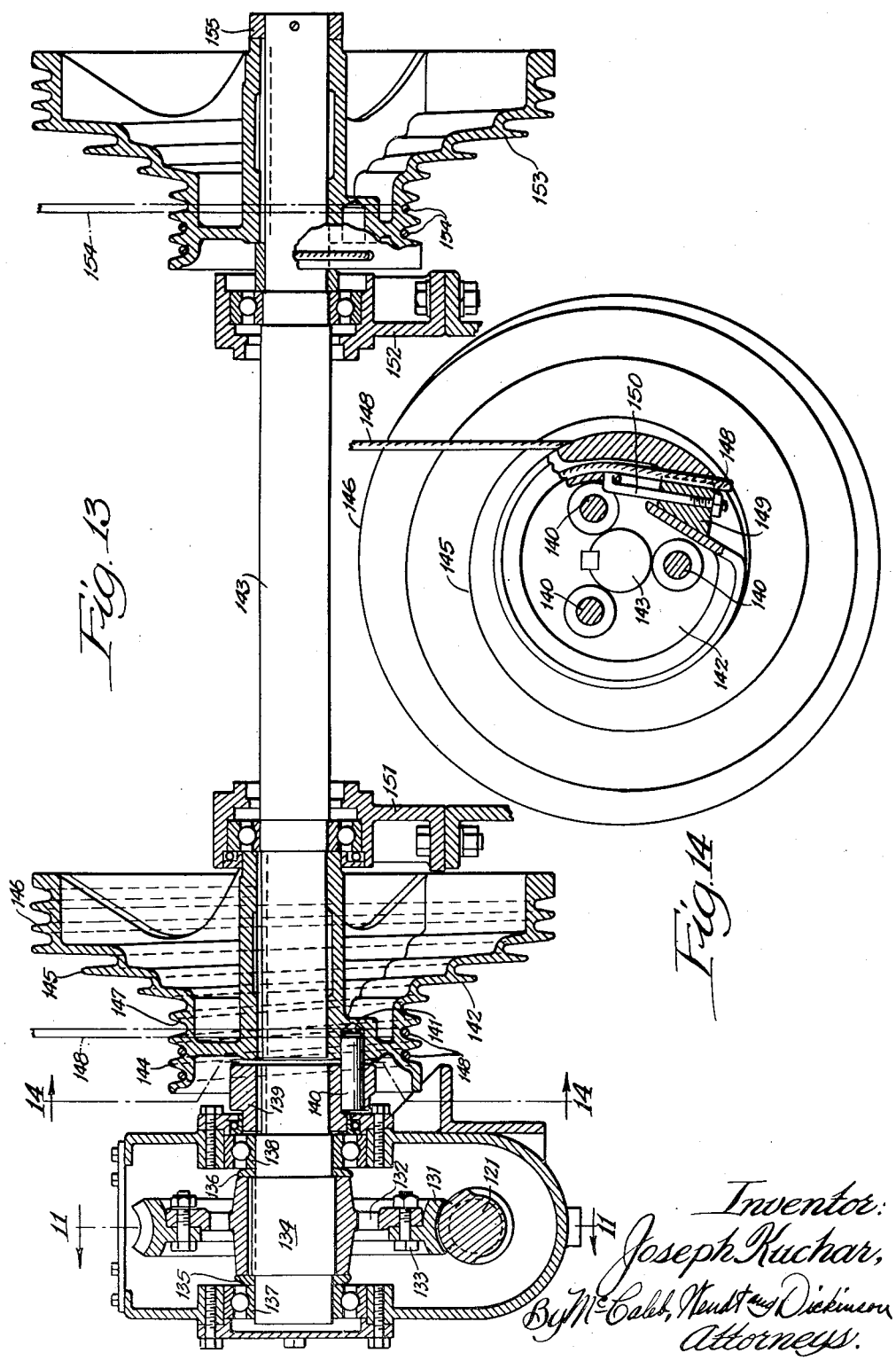
Inventor:
Joseph Kuchar,
By McCaleb, Hendt and Dickinson
Attorneys.

July 6, 1943.　　　　J. KUCHAR　　　　2,323,404
MATERIAL HANDLING AND LOADING APPARATUS
Filed July 2, 1941　　　　16 Sheets-Sheet 10
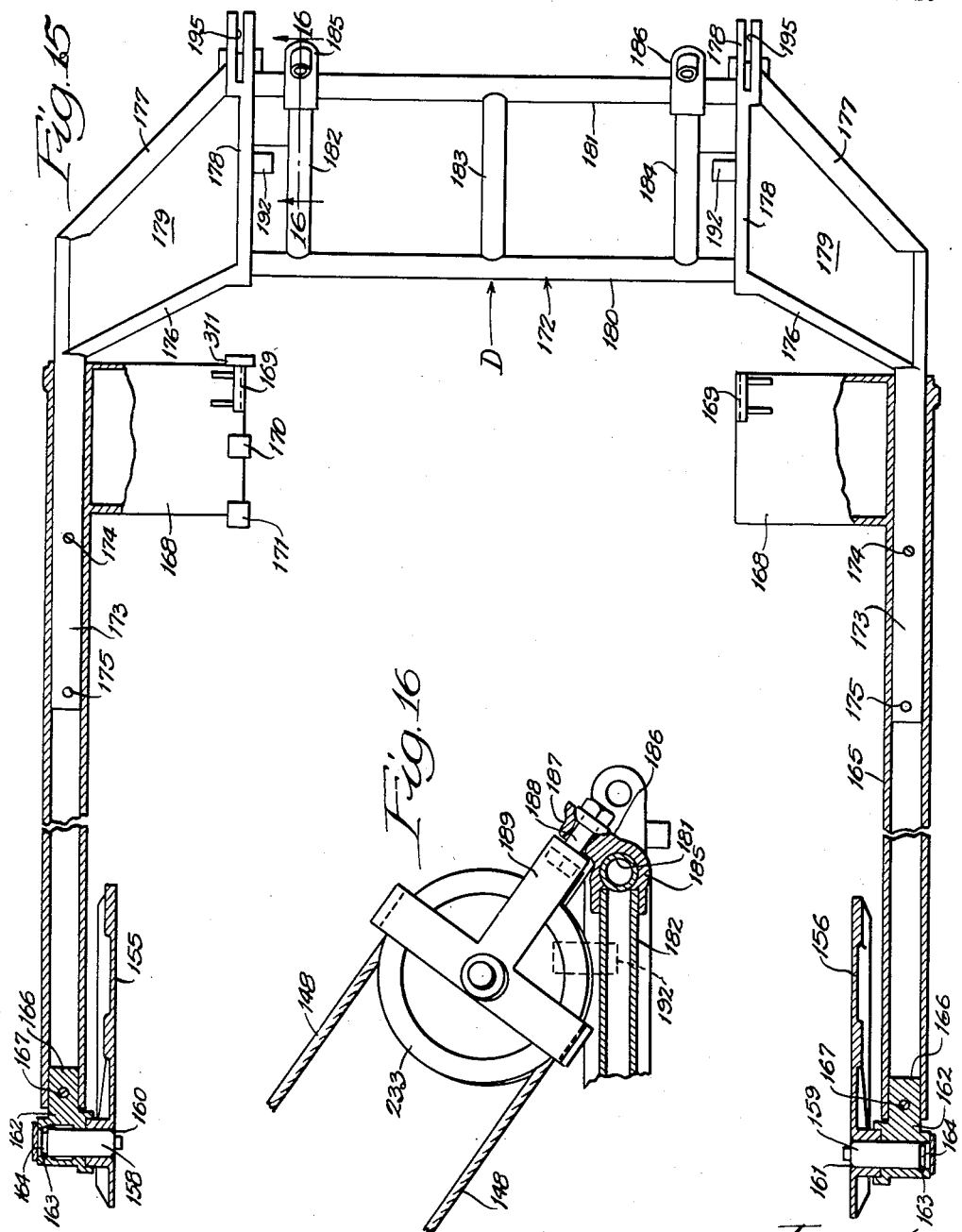

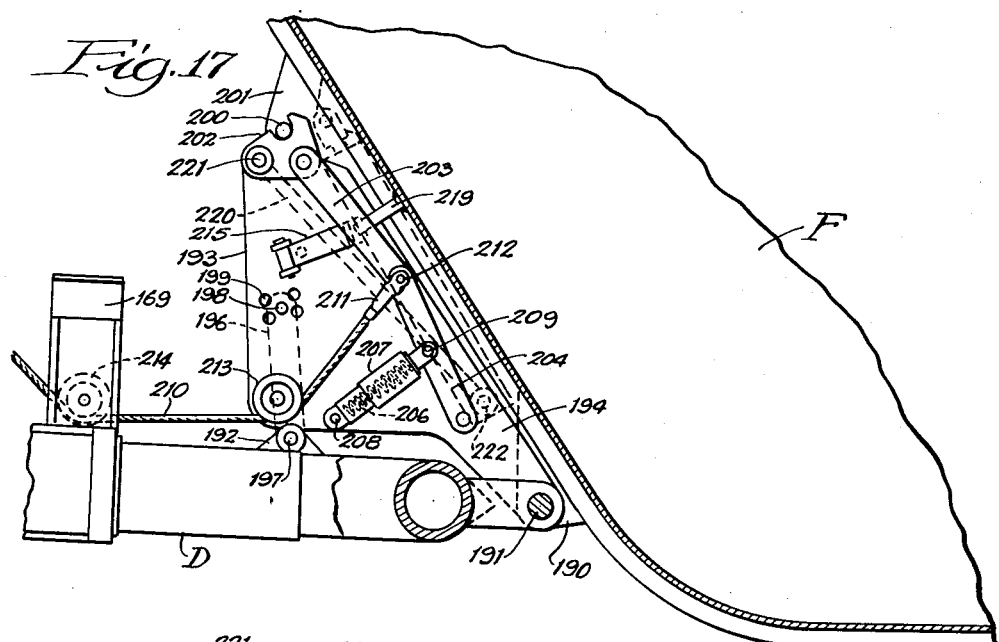
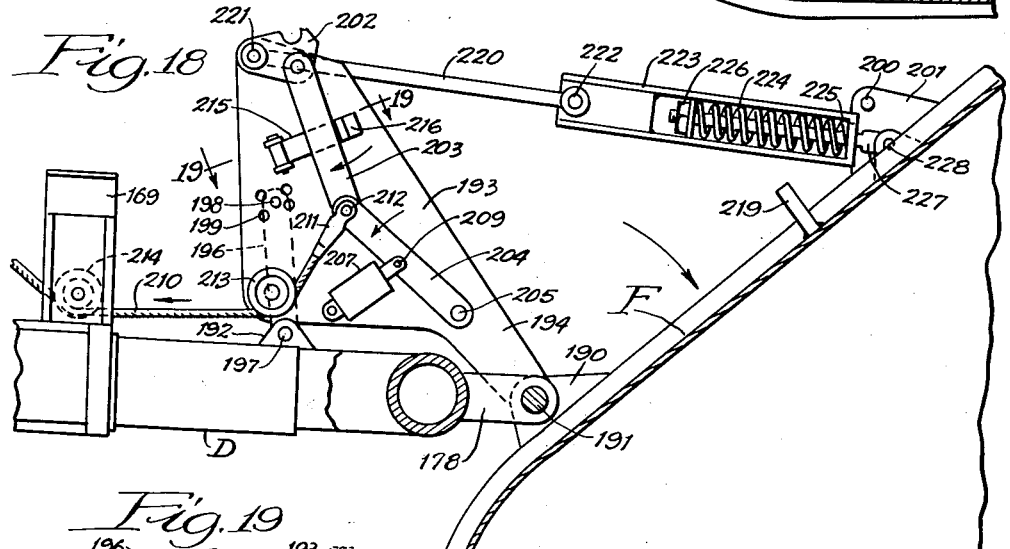
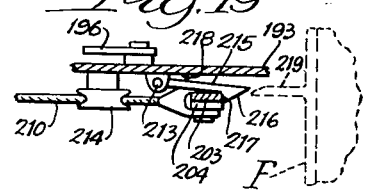

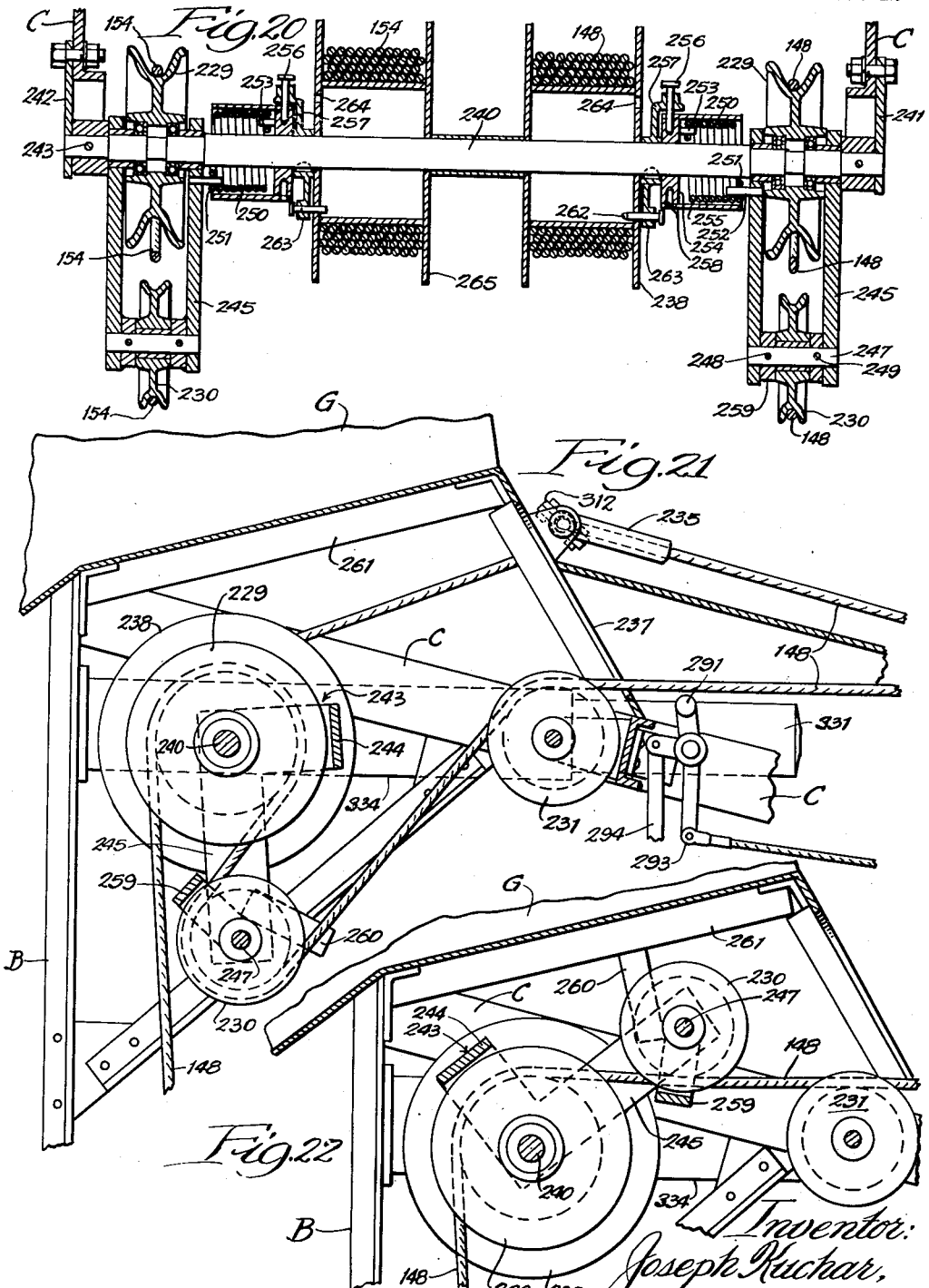

July 6, 1943. J. KUCHAR 2,323,404
MATERIAL HANDLING AND LOADING APPARATUS
Filed July 2, 1941 16 Sheets-Sheet 13
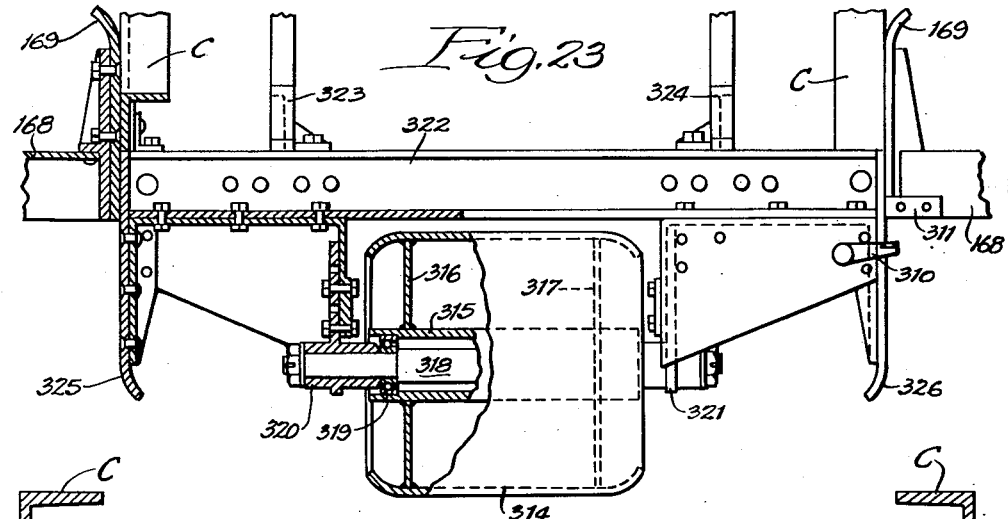
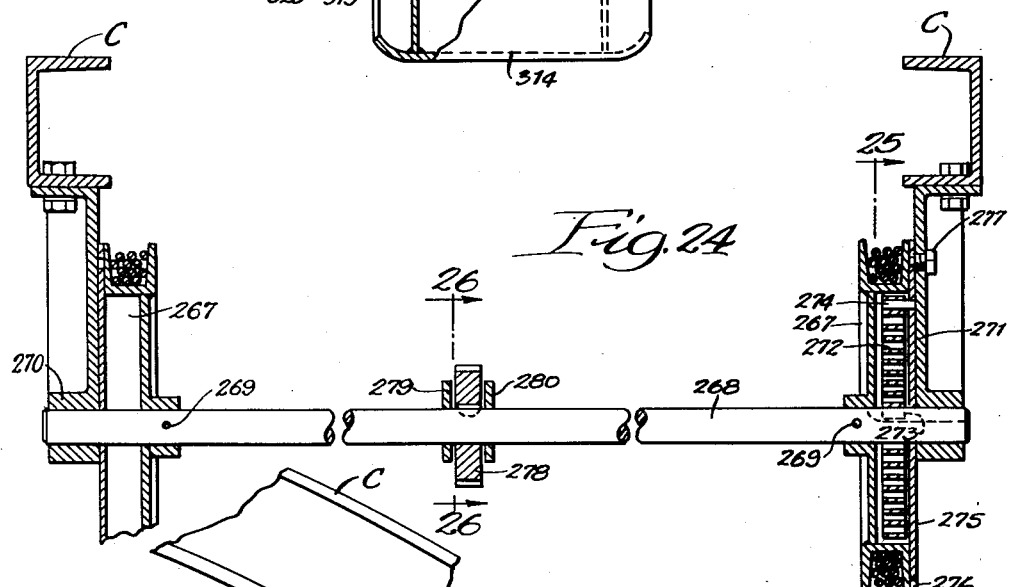
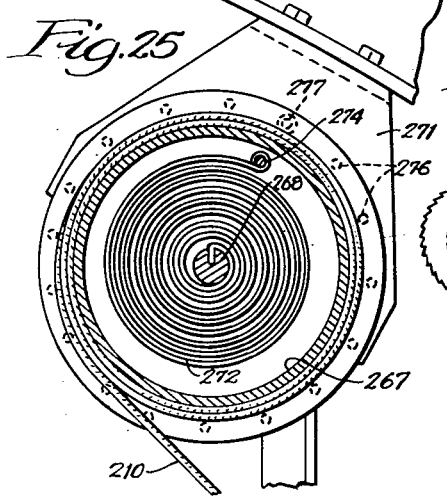
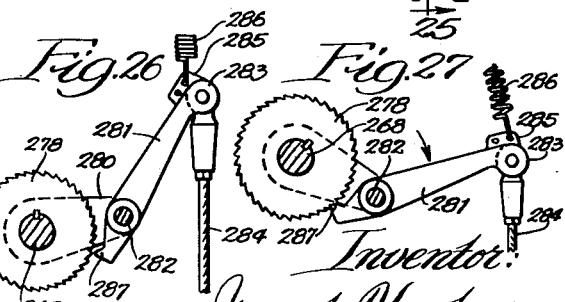
Inventor:
Joseph Kuchar,
By McCaleb, Wendt & Dickinson
Attorneys.

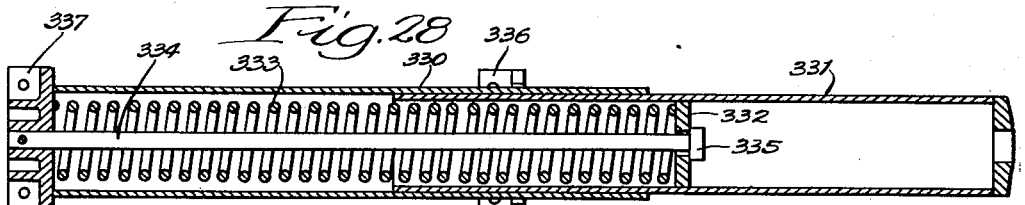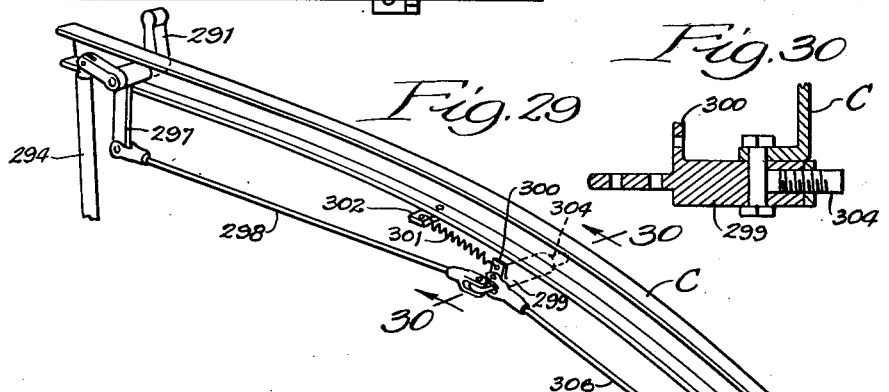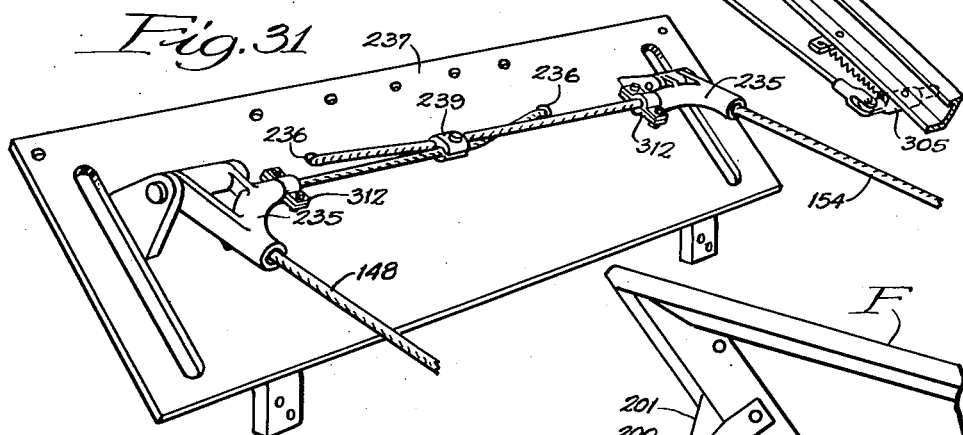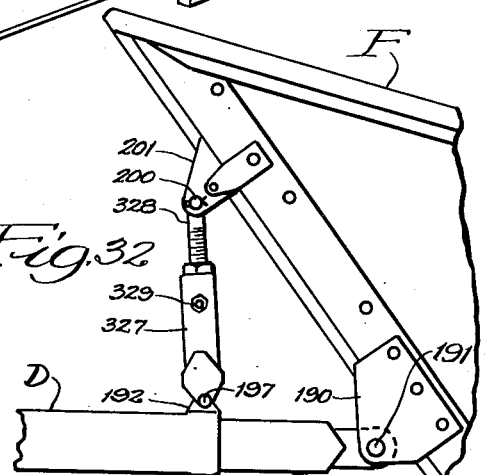

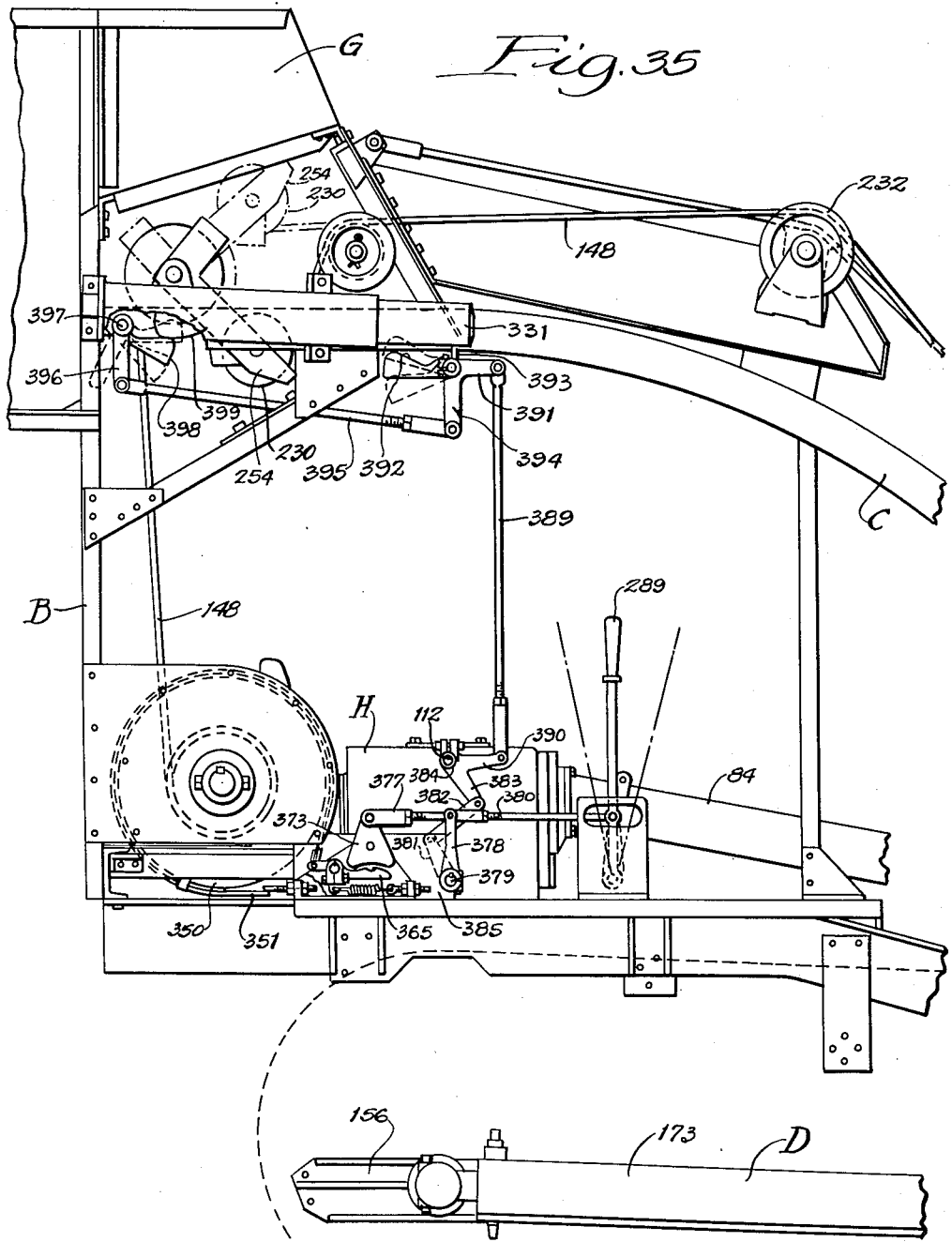

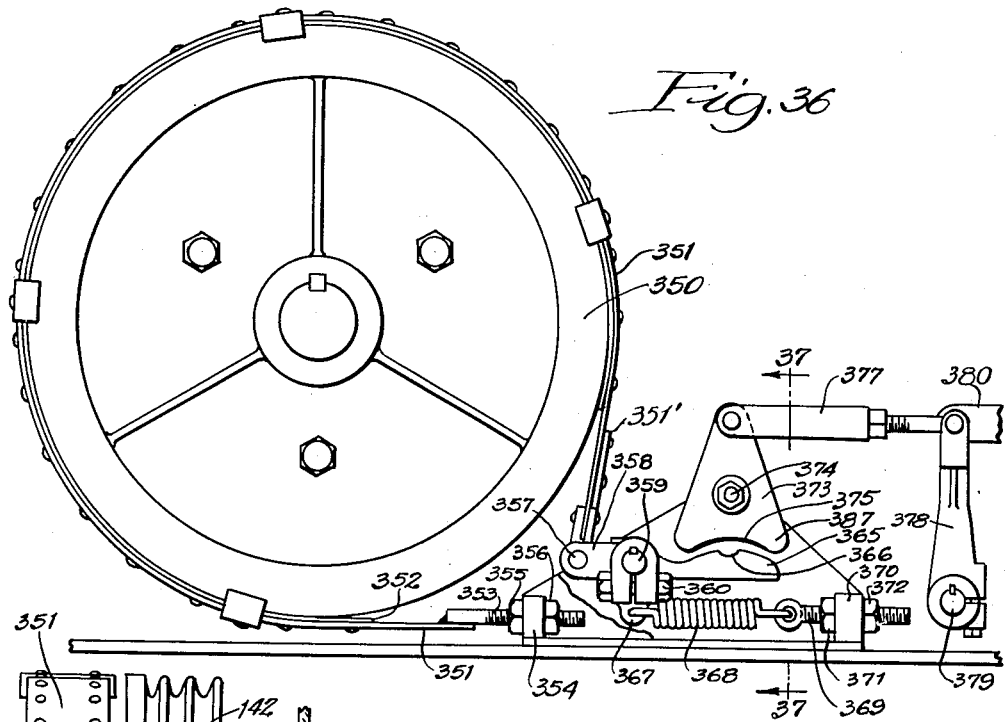
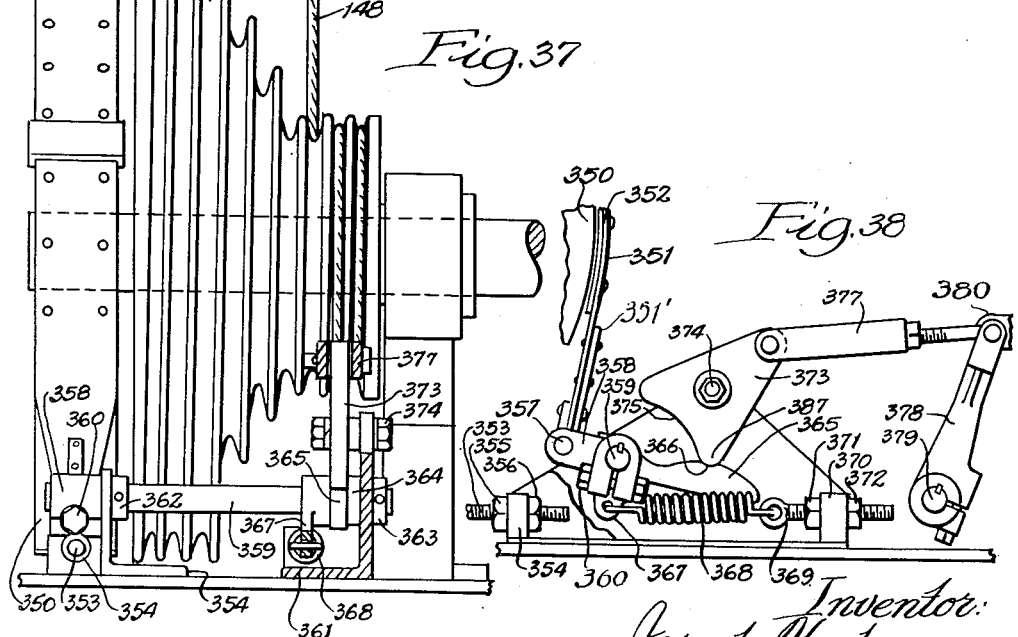

Patented July 6, 1943

2,323,404

UNITED STATES PATENT OFFICE 2,323,404

MATERIAL HANDLING AND LOADING APPARATUS

Joseph Kuchar, Chicago, Ill., assignor to Athey Truss Wheel Company, Chicago, Ill., a corporation of Illinois Application July 2, 1941, Serial No. 400,768

24 Claims. (Cl. 214—131)

My invention relates to material handling and loading apparatus, and especially to apparatus to be mounted on a tractor—preferably a Caterpillar type of tractor—to be operated by the tractor engine with a scoop or the like on a boom pivoted to swing upwardly over the tractor for overhead discharge into a truck, for example.

Among the objects and features of my invention are these:

An improved and simplified forward power take-off from the front of the engine which is better adapted for superficial application as an accessory to a standard tractor, and whereby the drive of the hoisting apparatus is independent of the clutch and transmission of the tractor drive so that the hoisting of the scoop is not interrupted in shifting the driving gears of the tractor;

A simplified adjustment for the height and inclination of the entering edge of the scoop, even though the scoop be pivotally mounted on the boom for forward dumping;

An automatic throw-out for the hoisting mechanism whereby the boom may be stopped at desired predetermined positions, such for example as the rearward dumping position, the carrying position, the forward dumping position, and the scooping or crowding position;

An automatic throw-out for the boom when it reaches a predetermined position, so arranged as to permit the boom, after being automatically stopped at that position, to continue its movement past that position and in the same direction;

Provision, automatically effective whenever the descent of the boom is arrested as by the scoop contacting the top edge of the material-containing body of the truck, for both taking up the slack in the hoisting cable and disengaging the winch;

A design of apparatus which is applicable as an accessory to a standard tractor without change in the tractor itself, and in which the scoop or scoop and boom may be removed when the tractor is to be used for general purposes, with the remainder of the apparatus still left on the tractor being so arranged as not to interfere with the normal operation of the tractor for general purposes;

A take-up for the forward dumping release cable which acts continuously to take up the slack in the release cable so that it is ready for instant operation regardless of the position of the boom;

A convenient storage for a reserve length of cable as an integral continuation of the active reach of cable at the end thereof least subject to breakage, whereby upon a break in the cable more of the cable may be transferred from the reserve storage without the necessity of complete rethreading of the cable or the necessity of discarding a major reach of the working length of the cable;

An improved latch, release, and shock absorber for the scoop pivotally mounted on the boom, whereby to facilitate forward dumping;

An arrangement of hoisting cables and sheaves therefor designed to insure clearance of the upper forward end of the tractor, even though the cables are withdrawn from and re-laid upon some of the sheaves during the rise and fall of the boom;

An improved winch drum of a grooved generally conical type in which the several radii of the grooves at various stages are better designed to meet the pull requirements on the hoisting cable;

An improved automatic braking of the winch; and

A boom on which a bulldozer, scraper, snow shovel, log lifter or the like, may readily be interchangeably substituted for the scoop or bucket, this being especially facilitated and simplified by incorporating the minimum operating parts on the scoop as distinguished from the boom.

Other objects and advantages of the invention will be apparent from the following description and the accompanying drawings, in which similar characters of reference indicate similar parts throughout the several views.

Referring to the drawings:

Fig. 1 is a view in side elevation of a tractor of the track-laying type, having a loading mechanism embodying the present invention assembled therewith, a boom being illustrated in solid lines in a downward or digging position, and in dotted lines in an intermediate or carrying position;

Fig. 2 is a plan view of the loading mechanism illustrated in Fig. 1 as it would appear disassembled from the tractor;

Fig. 3 is a rear elevational view of the loading mechanism illustrated in Figs. 1 and 2, a portion of a chute being broken away to disclose a cable sheave arrangement, and cable storing drums, the tractor being indicated in dotted lines;

Fig. 4 is a view in side elevation of the loading mechanism, with a bucket illustrated in solid lines in forward dumping position, and in dotted lines in intermediate or transport position, the tractor being indicated in dotted outline.

Fig. 5 is a view similar to Fig. 4, the bucket being illustrated in solid lines in rearward dumping position, and in dotted lines in a secondary intermediate position above the intermediate position illustrated in Fig. 4;

Fig. 6 is a sectional view taken on the plane of the line 6—6 of Fig. 7, a portion of the left-hand side of a gear casing being broken away to show a clutch housing and mounting bracket;

Fig. 7 is a vertical longitudinal sectional view taken on the plane of the line 7—7 of Fig. 6;

Fig. 8 is a fragmentary sectional view taken on the plane of the line 8—8 of Fig. 6, showing the power take-off and the gear train illustrated in Figs. 6 and 7;

Fig. 9 is a fragmentary plan view of the clutch housing and mounting bracket illustrated in Figs. 6 and 7, a portion of the gear casing being included;

Fig. 10 is a vertical longitudinal sectional view through the clutch and transmission unit on a plane bisecting the clutch drive shaft;

Fig. 13 is a fragmentary vertical transverse sectional view, taken on the plane of the line 13—13 of Fig. 1, showing the worm drive unit and driven cable winch assemblies;

Fig. 14 is a vertical sectional view taken on the offset planes of the broken line 14—14 in Fig. 13, a portion of a cable winch drum being broken away to show a cable end clamp embodied in the winch drum;

Fig. 15 is a plan view of a U-shaped boom, a pair of tubular side arms and tractor mounting plates being illustrated in section to disclose the structure more clearly;

Fig. 16 is a fragmentary sectional view through a boom hoisting sheave taken as on the plane of the line 16—16 of Fig. 15;

Fig. 17 is a fragmentary sectional view taken as on the plane of the line 17—17 of Fig. 2, showing the bucket forward-dumping mechanism in latched carrying position;

Fig. 18 is a view similar to Fig. 17 showing the mechanism unlatched to release the bucket for forward dumping;

Fig. 19 is a fragmentary sectional view taken as on the plane of the line 19—19 of Fig. 18, showing a toggle-retaining pawl and pawl-release cam;

Fig. 20 is a fragmentary transverse vertical sectional view taken as on the plane of the line 20—20 of Fig. 1, showing a cable take-up sheave arrangement and cable storage drums;

Fig. 21 is an enlarged fragmentary sectional view taken as on the plane of the line 21—21 of Fig. 3, showing the cable take-up sheave arrangement in fully operated position;

Fig. 22 is a fragmentary sectional view similar to Fig. 21, showing the cable take-up mechanism in unoperated or load-carrying position;

Fig. 23 is an enlarged fragmentary front elevational view of the front frame structure, including an axle and a front support drum which is provided to prevent forward tilting of the machine during a digging or load-carrying operation, a portion of the frame and drum assembly being shown in section;

Fig. 24 is an enlarged fragmentary sectional view taken as on the plane of the line 24—24 of Fig. 1, showing a spring-held shaft with cable drum and ratchet and pawl trip mechanism;

Fig. 25 is a sectional view taken on the plane of the line 25—25 of Fig. 24;

Fig. 26 is a sectional view taken on the plane of the line 26—26 of Fig. 24, showing a ratchet and pawl in normal disengaged position;

Fig. 27 is a view similar to Fig. 26, showing the ratchet and pawl in engaged operated position;

Fig. 28 is an enlarged vertical longitudinal sectional view taken on the plane of the line 28—28 of Fig. 2;

Fig. 29 is a fragmentary perspective view of an arcuate frame member with a pair of intermediate boom stops and an upper limit boom stop mounted thereon and connected to each other by suitable link and lever arrangements;

Fig. 30 is an enlarged fragmentary sectional view taken on the plane of the line 30—30 of Fig. 29;

Fig. 31 is an enlarged detail elevational view showing a cable anchor plate and associated parts;

Fig. 32 is an enlarged fragmentary side elevational view showing a boom end with a modified form of bucket-mounting support;

Figure 11:
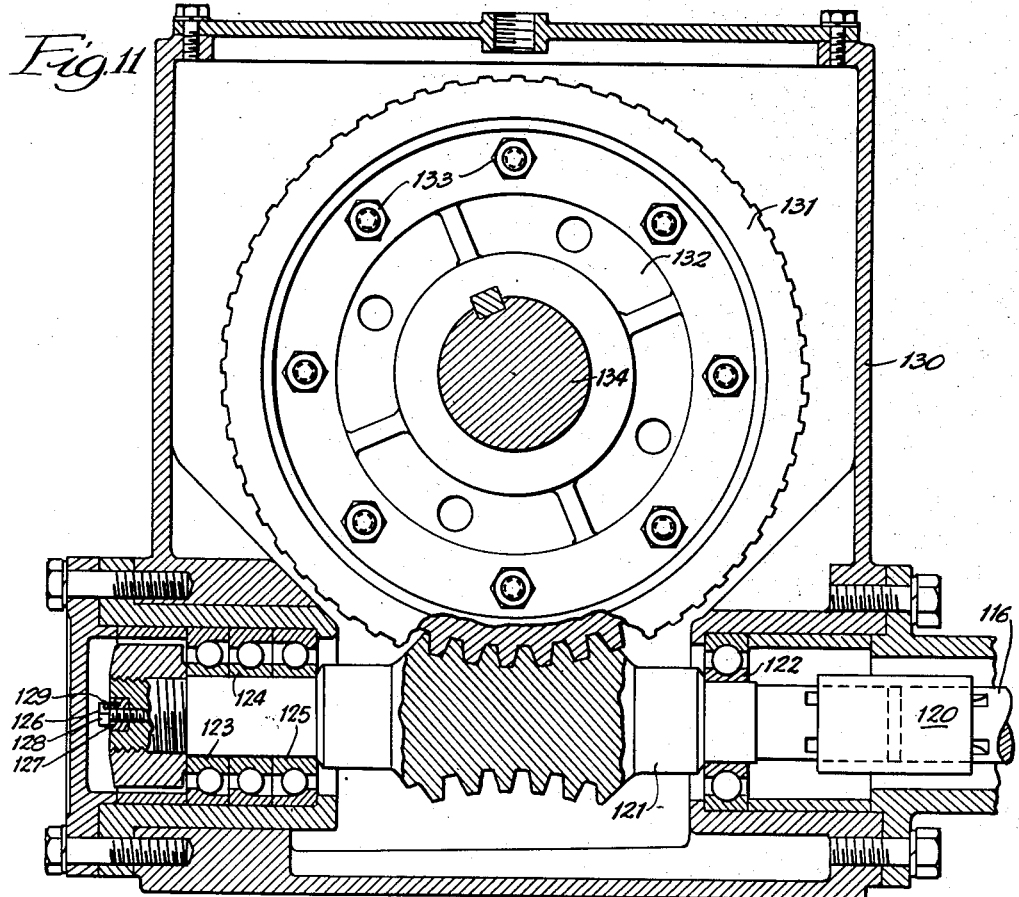
Fig. 11 is a vertical longitudinal sectional view through a worm drive unit, taken as on the plane of the line 11—11 of Fig. 13.

Fig. 33 on page 2 of the drawings is a view similar to Fig. 32, showing a bulldozer mounted to replace the bucket of Fig. 32 by interchangeable mounting means;

Fig. 34 is a fragmentary elevational view showing the right-hand side of Fig. 33;

Fig. 35 is a fragmentary view in side elevation of a modified form of control apparatus, including a brake applied to the winch drum, and associated clutch and brake control mechanism;

Fig. 36 is an enlarged fragmentary view of the brake mechanism illustrated in Fig. 35;

Fig. 37 is an enlarged fragmentary section taken in the plane of the line 37—37 of Fig. 36; and Fig. 38 is a fragmentary view of the brake-operating mechanism illustrated in the right-hand portion of Fig. 36, showing the brake control mechanism operated to release the brake.

Referring to the drawings in detail, and considering the invention as a whole, the complete illustrative embodiment of the invention is best shown in Figs. 1 to 5, inclusive.

The mechanism is intended for mounting on a tractor, and is here illustrated as being mounted on a tractor of the track-laying type referred to generally by the character A. The tractor is illustrated more or less schematically, and the customary tractor controls have been omitted from the illustrations for the purpose of clarity.

The loading mechanism constituting the present invention comprises the following main structural groups to be later described in detail.

A structural framework illustrated generally by the character B is adapted to be mounted on the tractor A and is provided with somewhat arcuately curved guide tracks C, which serve as guide-ways for a U-shaped boom D, the tracks C also comprising important structural members of the framework B. The boom D is pivotally supported on trunnions which are mounted on the track roller frame of the track-laying mechanism of the tractor.

A latch-release mechanism E is provided to permit of a forward dumping of the contents of a bucket F where such forward dumping is required. The contents of the bucket can also be dumped rearwardly by swinging the boom and bucket to the fully raised position indicated in solid lines in Fig. 5, whereby the contents of the bucket may be dumped into a rearwardly disposed chute G carried by the upper rear end of the framework B.

The boom-operating mechanism is actuated through suitable clutch and transmission mechanism contained in a housing H, and is driven through a power take-off I mounted on the front of the tractor.

*Power take-off*

Referring now to the various structural groups in detail; the power take-off I illustrated in detail in Figs. 6 to 9 inclusive comprises a train of gears mounted in a cast gear case 40. The gear case 40 is provided with a rearwardly projecting clutch housing 41 which has a pair of laterally projecting flanges 42 and 43, by means of which the gear case 40 is bolted to a lower cast iron radiator compartment 44. The casting 44 is the regular tractor radiator casting which, in the particular structure illustrated, is sufficiently heavy and strong to support the gear case, although, if desired, suitable conventional type mounting and bracing members, not illustrated, may be used to support the gear case 40.

An opening 45 is provided in the rear wall of the clutch housing 41 to align with an opening 46, customarily provided in radiators of this type to receive a conventional starting crank, the opening 46 being in line with the crank shaft 52 of the drive motor of the tractor A.

A ball bearing 47 is mounted in a recess in the opening 45 to support a splined shaft 48 which is mounted to rotate freely within the radiator opening 46. The rear end of the splined shaft 48 has splined connection with a gear 49, which is in mesh with the internal teeth 50 of a special V belt pulley 51. The pulley 51 is keyed to the tractor engine crank shaft 52, and is secured in position thereon by means of a nut 53.

A splined clutch member 54 is slidably mounted on the forward splined end of the shaft 48, and is provided with dogs or teeth 55, which are adapted to have clutch engagement with corresponding dogs 56 on a gear shaft 57.

The slidable clutch member 54 is provided with a clutch collar 58 which is mounted to permit rotation of the clutch member 54, the collar 58 being retained against longitudinal displacement by means of a spring snap-ring 59. The clutch collar 58 is provided with a pair of diametrically opposite studs 60 which are mounted in a conventional shifting fork 61.

The fork 61 is affixed to a shaft 62, and a clutch throw-out lever 63 is also secured to the shaft 62, where the shaft projects from a side of the clutch housing 41, to permit manipulation of the clutch.

An oil seal gasket 64 is mounted to seal the opening 45, thereby to prevent the escape of grease or oil from the clutch housing, and likewise to seal this point against the entrance of dust and dirt. Similar seals are preferably used throughout the entire construction where necessary or desirable, although some of such seals have been omitted from the present illustrations for the purpose of clarity. A removable closure plate 65 is secured in position over an opening in the top of the clutch housing 41.

The driven gear shaft 57 is mounted in a pair of ball bearings 66 and 67 mounted in aligned openings in the gear case 40. The bearing 67 is held in position by means of a closure plate 68 which is bolted to the front of the gear housing 40. Similar closure plates, such as the plates 69 and 70, are provided over each of a series of openings provided for mounting the bearings of each gear in the train.

A gear 71 is keyed to the shaft 57 and is in meshed engagement with an idler gear 72, and thence through intermeshing idler gears 73 and 74, with a terminal gear 75. Each of the intermediate or idler gears 72, 73 and 74 are mounted similarly to the gear 74 illustrated in Fig. 8.

The gear 74 is keyed to a short shaft 76 journaled in a pair of ball bearings 77 and 78, the rear bearing 77 being mounted in a machined boss 79, and the front bearing 78 being mounted similarly to the bearing 67 in Fig. 7.

The terminal gear 75 is keyed to a splined shaft 80, which has splined connection with a universal joint member 81, the universal joint being generally similar to that indicated by the numeral 82 in Fig. 10.

The universal joint driven by the splined shaft 80 has driving connection with a torque tube 83 (see Fig. 10), which is enclosed in a tubular casing 84, the torque tube 83 having the universal joint 82 secured to its upper, or rear, end.

The tubular casing 84 is clamped at its upper, or rear, end, as illustrated in Fig. 10, in a boot connection 85, the boot 85 being in turn bolted to the transmission housing H.

*Transmission*

Figure 12:
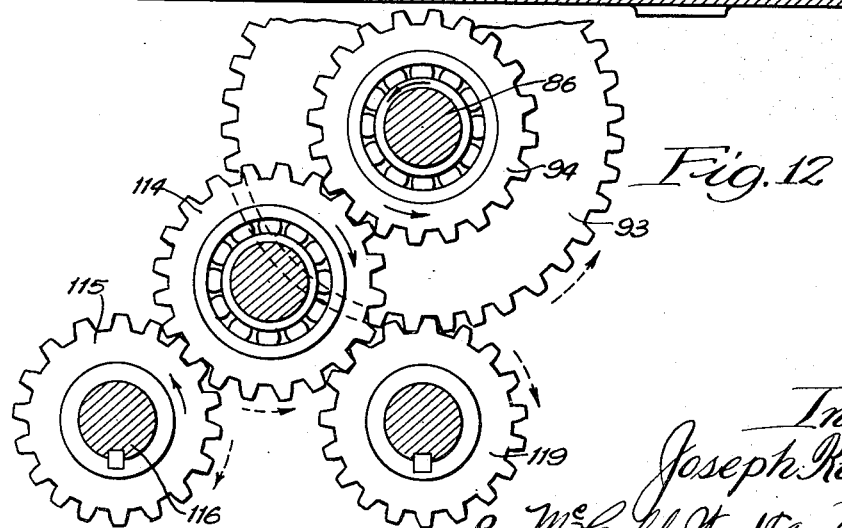
Fig. 12 is a fragmentary sectional view of the transmission gearing, taken as on the plane of the line 12—12 of Fig. 10.

The transmission mechanism, such as a mechanical or hydraulic drive is illustrated in one form in Figs. 10 and 12. A transmission drive shaft 86 has driven connection with the universal joint 82, and is journaled in ball bearings 87 and 88. A clutch sleeve 89 (see Fig. 10) is keyed to the shaft 86, and is provided with two sets of driving clutch discs 90 and 91, which have conventional driven engagement with the sleeve 89, and are retained loosely in position on pins 92.

A pair of clutch gears 93 and 94 are mounted on ball bearings 95, 96, 97 and 98, each of the clutch gears 93 and 94 having a set of clutch plates 99 and 100, respectively, in notched engagement therewith, the clutch plates 99 and 100 being relatively interposed between the driving clutch discs 90 and 91, respectively. Normally, with the clutch in neutral position, the driving clutch discs 90 and 91 are free to rotate independently of the driven clutch discs 99 and 100. A clutch operating mechanism for selectively engaging the gears 93 and 94 comprises a collar 101, which is slidably mounted on the sleeve 89, and is keyed thereto as by means of a stud 102 secured to the collar 101 and mounted to ride in a slot 103 in the sleeve 89.

The collar 101 is rounded on its inner edges to permit it to ride up on linked rollers 104 and 105, which are mounted in a slotted opening 106 in the clutch sleeve 89, normally to roll upwardly on an inclined face of one or the other of a pair of clutch operating rings 107 and 108, as in the position occupied by the right-hand linked roller 104 in Fig. 10.

With the roller in this position, the driven clutch plates 99 are free to rotate with respect to the driving clutch plates 90, and permit the shaft 86 to rotate independently of the clutch gear 93. When, however, the clutch operating collar 101 is moved to overlie the link roller as in the case of the link roller 105 in Fig. 10, the roller is forced inwardly across the cam face of the clutch operating ring 108 to force the driving clutch discs 91 into clutch engagement with the driven discs 100 thereby to drive the clutch gear 94.

The clutch collar 101 is operated by means of a clutch collar ring 109, which is mounted in a groove in the clutch collar 101 to permit free relative rotation of the clutch collar 101 with respect to the clutch collar ring 109.

The ring 109 is provided with a pair of studs 110, which are engaged by a shifting fork 111, which is secured to a clutch shaft 112.

The clutch shaft 112 projects through the wall of the transmission housing H, and has affixed to the exterior end thereof, a T lever 113, as illustrated in Fig. 1.

The arrangement of the transmission gears is best illustrated in Figs. 10 and 12. When the clutch mechanism is in the operated condition illustrated in Fig. 10, the transmission shaft 86 is brought into driving engagement with the gear 94. The gear 94 is in constant meshed engagement with an intermediate idler gear 114, which in turn is in meshed engagement with a driven gear 115 mounted on a worm gear drive shaft 116.

This gear train, comprising the gears 94, 114 and 115, drives the boom operating mechanism for raising the boom, and hence has a lower gear ratio than the gear train employed for lowering the boom, where less power is required. By moving the T lever 113 counterclockwise, the clutch collar 101 is moved from its extreme left-hand position illustrated in Fig. 10, toward the right thereby to override the link roller 104. This action forces the link roller 104 inwardly to move the clutch operating member 107 to the right from the position illustrated in Fig. 10, thereby releasing the left-hand clutch plates and forcing the right-hand clutch plates 90 and 99 into clutch engagement. This causes the gear 93 to rotate with the shaft 86, and thereby drives a reversing pinion 117, which is in mesh with the clutch gear 93.

The reversing pinion 117 is keyed to a countershaft 118, which has a pinion 119 similar to the pinion 117 keyed to the opposite end thereof. The pinion 119 is in mesh with the gear 114, which in turn is in mesh with the gear 115.

In Fig. 12, the solid-line arrows indicate the directions of rotation of the various gears and pinions during a boom lifting operation, while the dotted-line arrows in the same figure indicate the directions of rotation of the gears during a boom lowering operation.

*Worm gear mechanism*

The worm drive shaft 116 has splined connection with a collar 120 (see Fig. 11), which collar in turn has splined connection with a worm gear 121. The right-hand end of the mechanism illustrated in Fig. 11 is a continuation of the left-hand end of the mechanism of Fig. 10. It will be noted in Fig. 11 that the worm gear 121 has its right-hand end journaled in a conventional type of ball bearing 122, while the left-hand end of the worm gear is journaled in a triple thrust-ball-bearing arrangement. Two of the thrust bearings, namely, the bearings 123 and 124, are mounted to resist a thrust toward the left from the position illustrated in Fig. 11, while the third bearing 125 is positioned to resist such a thrust toward the right. The inner races of these bearings are held on the worm gear shaft by means of a nut 126, which is threaded onto the shaft and is locked thereon as by means of a transverse key 127. The key 127 is secured in a slot, extending across the end of the worm shaft and the nut 126, by means of a cap screw 128. The cap screw 128 is secured against rotation by means of a suitable lock wire 129.

The worm gear mechanism is mounted in a cast housing 130, and is in driving meshed engagement with a spiral gear 131, which is illustrated as being made in the form of a ring, bolted to a hub or spider 132 by means of bolts 133, as illustrated in Figs. 11 and 13.

The worm gear 131 is intended to turn counterclockwise during a load-lifting operation, and for this reason the two thrust-bearings 123 and 124 are provided as illustrated to resist this major thrust. The thrust will be in the same direction during a lowering of the boom, since the weight of the boom tends to return it to a lowered position by gravity, and the worm gear and pinion merely slack off the cable to control the lowering of the boom.

The hub 132 of the spiral gear is keyed to a winch-drum drive-shaft 134, the shaft 134 being maintained in position in the housing by two spacing collars 135 and 136. The shaft 134 is journaled in a pair of ball bearings 137 and 138, which are supported in a conventional manner in the housing 130.

A dowel-type connecting collar 139 is keyed to the shaft 134 which shaft, it will be noted in Fig. 13, terminates flush with the right-hand face of the connecting collar 139. The collar 139 is provided with three dowels 140, which are inserted in three equally spaced openings 141 in the hub of a winch drum 142, the winch drum being keyed to a winch shaft 143.

*Winch drum assembly*

The winch drum 142 comprises a substantially cylindrical portion 144, a truncated conical portion 145, and an enlarged cylindrical portion 146. A single continuous helical groove 147 is formed throughout the entire peripheral area of the three portions of the winch drum so as to guide a hoisting cable 148 along the successive portions of the winch drum upon rotation of the drum.

The end of the cable 148 is gripped by means of a cam block 149 which is drawn by means of a hook bolt 150 into clamping engagement with an end of the cable 148 as illustrated in Fig. 14.

The shaft 143 is journaled in conventional ball bearings which are mounted in frame members 141 and 152. A second substantially similar winch drum 153 is keyed to the shaft 143 in a manner similar to the drum 142, to receive a cable 154, the winch drum 153 being retained on the shaft 143 by a collar 155 pinned to the shaft 143.

*The boom*

The cables 148 and 154 are used to operate the boom D, illustrated in detail in Figs. 15 and 16.

A pair of boom trunnion support plates 155 and 156 are bolted one to each of the outer faces of the tractor track roller frames 157 (see Fig. 1).

Trunnion pins 158 and 159 are mounted one in each of the trunnion support plates 155 and 156, respectively, being retained therein as by welding at the points 160 and 161. Since the two sides of the boom are similar to each other, the same reference characters will be used to indicate similar parts of both sides of the boom. A fitting such as the fitting 162 is journaled one on each of the trunnion pins, the fitting being retained on the trunnion pin as by means of a bolt 163 which passes through the fitting 162 and rides in a groove 164 provided for this purpose in the trunnion pin.

A rectangular tube 165 is telescopically mounted over a rectangular boss 166 on each of the trunnion fittings, and is secured thereto as by means of a bolt 167. A boxed extension 168 is welded to the inner face of the outer end portion of each of the rectangular tubes 165, the extensions 168 projecting inwardly to ride against the outer sides of the arcuate frame members C thereby to retain the boom against lateral displacement.

A vertically extending guide plate 169 is welded to the upper face of each of the extensions 168 so that when the boom is in the lowered position, as illustrated in Fig. 1, the plates 169 remain in engagement with the outer faces of the arcuate frame members C to hold the boom against lateral displacement. A further function of the guide plates 169 will be later described herein in connection with a front frame and wheel construction.

A pair of stop plates 170 and 171 are mounted on one of the extensions 168, the outer stop plate 170 being positioned to engage a top limit de-clutching arm, to be described in detail later in the specification. The inner plate 171 is positioned to engage an intermediate de-clutching mechanism, also to be described in detail later in the specification.

A yoke 172 has a pair of rectangular tubular side members 173, telescopically mounted within the trunnioned tubes 165. A bolt 174, inserted through openings in the tubes 165 and 173, secures these tubes against longitudinal movement with respect to each other. Additional openings 175 are provided as desired in each of the side members 173 to receive the bolts 174 when the bucket support yoke 172 is telescopically extended with respect to the tubes 165 to increase the arc of movement of the bucket F, or other material-handling facilities about the trunnions 158 and 159.

A pair of angle iron members 176 and 177 are welded to the side member 173, the inner ends of the members 176 and 177 being welded to bucket pivot-support bars 178. A pair of bucket anchor lugs 192 are welded to the inner sides of the bucket pivot-support bars 178 to retain the bucket F against forward tilting by a mechanism illustrated in Figs. 17 and 18 to be later described in detail.

A closure plate 179 is welded to enclose the area bounded by the following structural members, namely, the end portion of the side member 173, the angles 176 and 177, and the bucket pivot-support bar 178. A similar plate, not illustrated, may be similarly welded to the bottom edges of the members enclosing each of the above described areas, so that the plate 179, and its corresponding bottom plate, completely box in the enclosure to provide a structure of great strength and clean design.

A pair of tubes 180 and 181 are welded to extend transversely between the bucket support bars 178. Bracing tubes 182, 183 and 184 are mounted to extend longitudinally between the tubes 180 and 181.

A pair of sheave-mounting brackets 185 and 186 are mounted one on the forward end of each of the longitudinal bracing tubes 182 and 184 as illustrated in Figs. 15 and 16. The brackets are each formed with a transversely disposed bore to receive the tube 181, and are also each provided with a socket to receive the end of the longitudinal brace tubes 182 and 184, respectively. The brackets 185 and 186 are preferably welded in position on the tubes 181 and 182.

Each of the brackets 185 and 186 is provided with an angularly offset arm 187, see Fig. 16, having an opening therein to receive a bolt 188 carried by a sheave frame 189. The sheave frame has a sheave pulley 233 pivoted therein in a conventional manner.

The bolt 188 is mounted in the opening in the arm 187 as illustrated to permit a slight toggle movement of the bolt 188 with respect to the bracket, so as to permit the bolt to align itself with the tensional force imposed on it in manipulating the boom, and also to permit a pivotal movement of the sheave with respect to the bracket 187.

Bucket forward dump mechanism

The bucket F is pivotally mounted on the bucket pivot-support bars 178 by means of ears 190 welded to project from the rear of the bucket as best illustrated in Figs. 1, 17 and 18, the ears 190 being spaced apart to receive the support bars 178 therebetween, and being pivotally mounted thereon by means of pivot pins 191.

A bucket mounting to permit forward dumping of the contents of the bucket is illustrated in Figs. 17 and 18. A support plate 193 of generally triangular shape is provided with a forwardly and downwardly extending tongue 194, which is mounted in a slot 195 (see Fig. 15) in each of the bucket pivot-support bars 178, the tongue 194 being provided with an opening to receive the pivot pin 191. The rear end of the triangular plate 193 is secured in position by means of a link 196, the lower end of which is connected to the lug 192 by means of a pin 197, while the upper end of the link 196 is secured to the plate by means of a bolt 198.

A plurality of openings 199 are provided in the plate 193, into any of which openings the bolt 198 may be inserted, whereby the plate 193 may be adjusted pivotally about the pin 191, to adjust the angular position of the bucket F with respect to the boom D.

A pair of latch studs 200 are each mounted on a triangular ear 201 welded to project from the rear of the bucket, and are adapted to be engaged by notched latch plates 202, pivotally mounted one at each of the upper ends of the triangular plates 193. Each of the latch plates 202 is pivotally connected to a link 203 of a pair of toggle links 203 and 204, the lower end of the link 204 being pivotally connected to the triangular plate 193 by means of a stud 205.

A compression spring 206 is enclosed in a telescoping casing 207 to protect the spring from dirt, the lower end of the casing 207 being pivotally connected as at 208 to the triangular plate 193. The other end of the casing 207 is pivotally connected, as at 209, to the toggle link 204 to urge the links 203 and 204 toward the locked position illustrated in Fig. 17, and thereby to force the notched latch plate 202 upwardly into latching engagement with the stud 200.

The casing 207 is provided with a conventional stop, not illustrated, at its outward limit of movement to prevent further clockwise movement of the toggle link 204 beyond the position illustrated in Fig. 17 to retain the latch plate 202 in latched engagement with the stud 200.

It will be noted in Fig. 1 that the center of gravity of the bucket is ahead of the pivot pin 191, so that upon releasing the latch mechanism, the bucket will be tilted forward by the force of gravity.

To release the bucket for forward dumping, a release cord 210 is secured by means of a suitable clevis connection 211 to the center pivot 212 of the toggle links 203 and 204. The cord 210 is passed beneath free pulleys 213 and 214, and thence to the spring-compensated bucket latch release mechanism E, to be later described in detail. Pulling the release cord 210 breaks the toggle connection from its locked position illustrated in Fig. 17, and moves it to its released position illustrated in Fig. 18, thereby compressing the coil spring 206.

To retain the toggle links in the released position illustrated in Fig. 18 while the bucket is in a forward tilted position, a toggle catch is provided which is illustrated in detail in Fig. 19. This catch comprises a spring-pressed pawl 215 having a sloping cam face 216 at its free end, and having a notch 217 adapted to engage the toggle link 203 to retain it in the position illustrated in Fig. 18. A compression coil spring 218 is mounted between the plate 193 and the pawl 215 to urge the pawl outwardly into latching position. A pawl release prong 219 is welded to project from the rear wall of the bucket F, the prong being positioned to engage the sloping cam face 216 of the pawl when the bucket is returned to normal position. The action of the prong 219 moves the pawl counter-clockwise from the position illustrated in Fig. 19, to release the toggle link 203 from the notch 217, which permits the compression spring 206 to return the toggle links to the latching position illustrated in Fig. 17.

An articulated shock absorber for arresting the forward swing of the bucket at the end of a bucket-dumping operation comprises a rod 220 pivotally connected at one end to a stud 221 on the triangular plate 193. The outer end of the rod 220 is pivotally connected as at 222 to a spring yoke 223. The yoke 223 has a coil spring 224 mounted therein, the spring being held in compression between the closed end 225 of the yoke, and a nut 226 mounted on an end of a rod 227 which is pivotally connected at 228 to the bucket F.

When the bucket is in the normal or load-carrying position illustrated in Fig. 17, the shock-absorber parts jackknife to the dotted line position illustrated. When the latch 202 is released, however, and the bucket swings clockwise about its pivot, the pin 191, to the forward dumping position illustrated in Fig. 18, the shock-absorber parts are swung into alignment as illustrated, and the coil spring 224 absorbs the shock of the forward tilting movement of the bucket and arrests the clockwise movement of the bucket at the bottom of its swing.

To restore the bucket to normal after a forward dumping operation, the boom is lowered until the forward edge of the bucket rests on the ground. The boom cables 148 and 154 are further slacked off so that the weight of the boom swings the bucket counter-clockwise about its pivot 191, until the prong 220 releases the toggle catch pawl 215 and permits the latch plate 202 to engage the latch stud 200. If necessary, to aid in swinging the bucket up into latched position, the tractor may be backed slightly during the latter phase of the boom-lowering operation above described.

There is no necessity to provide a bucket restoring mechanism, since in any event, the bucket must be lowered to take the next load of material being handled.

*Hoisting cables*

The boom hoisting cables 148 and 154 are best illustrated in Figs. 2, 3, 4, 20, 21 and 22. Since the cable arrangements for the two sides of the boom are substantially identical, the arrangement of but one side, namely, the cable 148, will be described in detail.

Starting from the winch drum 142, one end of the cable is secured to the winch drum as by means of the wedge 149, as previously described, and as illustrated in Fig. 14. Assuming that the boom D is in its shortened or normal adjusted position as illustrated in Fig. 16, and with the boom in the lowered position of Fig. 1, the hoisting cable 148 will be wound around approximately two convolutions of the helical groove 147 in the smaller cylindrical portion 144 of the hoisting drum.

From the hoisting drum the cable 148 passes vertically upward and over a free pulley 229. The pulley 229 is provided with a widely flaring groove as illustrated in Figs. 3 and 20 to receive the cable from varying angular positions as it is guided from one side of the winch drum 142 to the other by means of the helical groove 147 therein.

From the pulley 229, the cable 148 passes beneath a slack take-up pulley 230, and thence over an idler pulley 231, Fig. 1. The cable then passes over a wide-grooved idler pulley 232. When the boom is fully raised, the cable 148 is lifted out of contact with idler pulley 232, and the wide groove guides the cable back into the groove when the boom is again lowered.

Referring again to the solid-line illustration in Figs. 1 and 2, the cable 148 passes from the idler pulley 232 downwardly and around the sheave pulley 233, where it may be connected to the boom. Thence the cable passes upwardly and over a grooved quadrant 234. From this point the cable passes through curved anchor tubes 235 mounted on a plate 237, and thence through openings 236 in the plate 237, see Figs. 2 and 31, to a storage drum 238, see Figs. 3 and 20.

A cable clamp 239 is employed to clamp the ends of the cable 148 and 154 for the two sides of the machine to each other, so that when rigging a new cable on the apparatus, or renewing a section thereof, the tension on one of the side cables may be balanced by the tension on the other, and the cable passing from the clamp 239 to the storage drum is thereby relieved from stress. Once the cable stresses have thus been balanced, additional clamps 312 are secured to each of the cables adjacent the anchor tubes 235 to prevent slippage when the yoke is subjected to unequal stresses in operation.

*Slack take-up mechanism and cable storage drums*

In order to maintain the hoisting cables under tension at all times, and to reduce the possibility of any whipping of the cables causing the cables to jump the pulleys, a slack take-up mechanism as illustrated in Figs. 1, 20, 21 and 22 is provided. Such slack take-up mechanism is required principally due to the use of the spiral winch drums, and would not be necessary if straight cylindrical drums were used. The idler pulleys 229 (Fig. 20) are journaled on a through shaft 240 mounted in brackets 241 and 242, secured to the arcuate frame members C. The shaft 240 is secured against rotation as by means of bolts 243 which pass through the fittings 241 and 242 and the shaft 240. Since the slack take-up mechanisms are identical for both sides, the mechanism for one side only will be discussed in detail.

A yoke 243 is pivoted concentrically with the pulley 229, the sides of the yoke being L-shaped as best illustrated in Figs. 21 and 22, the short leg of the L having a transverse connecting portion 244, which ties the two sides of the yoke 243 together, and is spaced radially outwardly from the shaft 240 a sufficient distance to clear the idler pulley 229. The other arms 245 of the yoke are longer, and have the take-up pulley 230 journaled on a shaft 247 which is pinned to the yoke as at 248 and 249. The yoke 243 is maintained under constant resilient torque tending to rotate the yoke in a clockwise direction from the position illustrated in Figs. 1, 21 and 22, by means of a coil spring 250, see Fig. 20, one end of this spring being formed into a ring 251 to encircle a pin 252 mounted in the yoke 254. The opposite end of the coil spring 250 encircles a pin 253 secured in an opening in the head portion 254 of a spring housing 255.

The head 254 has a rotatable fit on the shaft 240, and is held in adjusted position thereon by means of a locking pin 256, which is slidably mounted in a bracket 257 keyed to the shaft 240. The locking pin 256 is adapted to be inserted in any of a plurality of radially disposed recesses 258 in the periphery of the head 254 of the spring housing 255.

The coil spring 250 is placed under initial tension by releasing the locking pin 256 and rotating the spring housing 255 by means of a suitable spanner wrench, not shown, to wind the spring 250 to produce a suitable initial torque. The pin 256 is then inserted in the nearest opening 258 to lock the housing 255 in adjusted position.

A tie strap 259 is welded across the ends of the longer arms of the yoke 245, the strap being mounted in the position illustrated in Figs. 21 and 22, so that when the yoke 245 is rotated in a counterclockwise direction to the position illustrated in Fig. 22, the tie strap 259 will not interfere with the free running of the cable 148.

A stop bar 260 is welded to one arm of the yoke 245 to contact a top frame member 261 when the yoke 245 is swung in a counterclockwise direction to the limit of its movement as illustrated in Fig. 22.

Two drums 238 and 265 for the storage of excess cable are best illustrated in Figs. 3 and 20. These drums are rotatably mounted on the shaft 240. A locking pin 262 is mounted in a bracket 263 to register with any of a plurality of openings 264 in each of the cable drums 238 and 265, normally to hold the drums against rotation, the locking pins 262 being releasably secured in their brackets by means of conventional cotter keys.

It has been found that the principal wear on the cable occurs throughout that portion of the cable which is wound upon the winch drums 142. When cable wear becomes apparent within this zone, it is a simple matter to release the ends of the cables from the winch drums by releasing the cam block 149, illustrated in Fig. 14, and, by releasing the cable storage drums 238 and 265 from their locking pins 262 illustrated in Fig. 20, and removing the cable clamp 239 illustrated in Figs. 2 and 31, to withdraw the required amount of new cable from the drums 238, sever the frayed end portions, and again secure the cable ends to the winch drums as illustrated in Fig. 14. The clamp 239 may then be replaced as illustrated in Fig. 31, and the drums 238 again secured by the pins 262 as illustrated in Fig. 20.

By this arrangement the life of the cable is lengthened in some instances many times by the mere provision of a somewhat longer cable in the first instance. The work involved in thus renewing the cable is also materially less than that involved in mounting a completely new cable each time the portion operated on by the winch drums becomes worn.

Bucket-trip operating mechanism

The bucket release cords 210 after passing beneath the idler pulleys 213 and 214 as illustrated in Figs. 1, 17 and 18, pass upwardly and rearwardly to a pair of spring-held storage drums 267 (see Figs. 24, 25, 26 and 27), the storage drums 267 being secured to a shaft 268 as by means of bolts 269. The shaft 268 is journaled in bearing brackets 270 and 271, bolted to the underside of the arcuate beams C. A coil spring 272 of the clock-spring type is associated with one of the drums 267, the spring 272 having one end 273 thereof bent inwardly and inserted in a keyway in the shaft 268, as illustrated in Fig. 24. The other end of the spring 272 is coiled around a pin 274 secured in a plate 275 pivoted on the shaft 268. The plate 275 is provided with a plurality of openings 276 (see Figs. 24 and 25) to receive a stud 277, which is threaded through the bracket 271 to enter one of the openings 276 to hold the plate 275, and thereby the spring 272, in adjusted position.

A ratchet wheel 278 is keyed to the shaft 268, and a pair of pawl support arms 279 and 280 are pivoted on the shaft 268, one on each side of the ratchet wheel 278, see Figs. 24, 26 and 27. A pawl 281 is pivotally mounted on a pin 282 carried by the outer ends of the arms 279 and 280, the pawl having clevis connection 283 with an operating cord 284.

The pawl 281 has an upwardly extending web 285 with perforations to receive the hooked end of a coil suspension spring 286. The perforations in the web 285 are out of vertical alignment with the clevis connection to the operating cord 284 so that a pull by the operator on the cord 284 from the position illustrated in Fig. 26 tends to rotate the pawl 281 clockwise about the clevis connection 283, thereby forcing the nose 287 of the pawl into engagement with the teeth of the ratchet wheel 278. Further downward pull on the cord 284 rotates the ratchet wheel 278 clockwise from the position illustrated in Fig. 26 to that illustrated in Fig. 27. This movement of the ratchet wheel 278 causes a corresponding rotative movement of the shaft 268 to which the ratchet wheel is keyed, and a similar rotative movement of the drums 267, thereby winding a portion of the bucket release cables 210 onto the drums 267. This action causes the toggle arms 203 and 204 to be moved to the position illustrated in Fig. 18, and releases the bucket F for forward dumping movement as illustrated in Figs. 4 and 18.

When the cord 284 is released by the operator, the spring 286 restores the pawl to the position illustrated in Fig. 26, where the combined weight of the pawl 281 and the arms 279 and 280 tend to drop the pawl to the position illustrated in Fig. 26 with the nose 287 of the pawl out of engagement with the ratchet wheel. The cord 284 may be connected to a hand operating lever 288 mounted conveniently to the operator as illustrated in Fig. 1.

Boom control mechanism

Pivotally mounted on the same bracket as the bucket release lever 288 is a boom control lever 289, see Figs. 1, 4 and 5. The boom control lever 289 is connected by means of a link 290 to the T lever 113, which is secured to the clutch control shaft 112 in the transmission housing H as illustrated in Fig. 10.

Moving the boom control lever 289 rearwardly, or to the left from the neutral position illustrated in Fig. 1, will, by means of the link 290, cause the T lever 113 to pivot clockwise from the position illustrated in Fig. 1. This action of the T lever moves the clutch shifting fork 111 to the position illustrated in Fig. 10, and thereby acts to raise the boom D by means of the gears 94, 114 and 115, see Fig. 12.

Moving the boom control lever 289 forwardly or to the right from the neutral position illustrated in Fig. 1, moves the T lever 113 and associated parts counterclockwise from the position illustrated in Fig. 10, to bring the gear 93 (Figs. 10 and 12) into clutched engagement with the transmission drive shaft. The action of the gear 93, through the gears 117, 119, 114 and 115, causes a reverse rotation of the winch mechanism to lower the boom.

Since the heavy boom and bucket frequently arrive at the top of their limit of swing with considerable momentum, it is necessary to provide cushioned means for resiliently absorbing this momentum and arresting their movement. The cushioned arresting means serves the additional purpose of preventing the boom from remaining poised in a position of equilibrium at top dead center. The cushioned arresting means, illustrated in detail in Fig. 28, comprises a pair of telescoping tubular members 330 and 331, the member 331 having a transverse wall 332 welded in position therein. A coil spring 333 is held in compression between this wall 332 and the end wall of the outer casing 330.

A rod 334 is pinned in position in an opening in the end of the casing 330, to limit the outward movement of the inner tubular member 331 under the thrust of the coil spring 333, the rod 334 being provided with a head 335 of larger diameter than an opening in the wall 332 in which the rod 334 is inserted.

The outer tubular member 330 is mounted on a pair of brackets 336 and 337 bolted to the frame B. The bracket 337 is preferably a malleable casting or forging formed to comprise the end wall of the outer tube 330, the tube 330 preferably being welded to both the brackets 336 and 337. The arresting members are mounted on the frame as illustrated in Fig. 2, so that the forward ends of the inner tubular members 331 are struck by the boom guide members 168 as the boom approaches the top of its swing.

A clutch release mechanism for automatically releasing the clutch at the top of the upswing of the boom D comprises a bell-crank lever 291 pivoted on the beam C, and having the upper end thereof projecting into the path of movement of the stop plate 170, see Figs. 1, 2, 4 and 29. A horizontal rearwardly extending arm of the lever 291 is pivotally connected to the upper end of a push rod 294 which has a reduced lower end portion 295 slidably mounted in an opening in the T lever 113. A coil spring 296 encircles the reduced lower end portion 295 of the rod 294, and is of sufficient stiffness normally to operate the T lever 113 without material compression of the spring. The spring 296 is, however, sufficiently resilient so that the operator, by forcibly manipulating the lever 289, would be able to overcome the thrust of the spring and hold the T lever 113 in an operated position if such action should be desirable.

Intermediate stop levers are mounted to de-clutch the boom drive mechanism automatically at selected intermediate points of travel of the boom D, see Figs. 29 and 30. The upper one of said stop levers is connected to the bell-crank lever 291 by a link 298 which has clevis connection with the lower end of the arm 297, and has similar clevis connection with a stop lever 299.

The stop lever 299 is pivoted to the underside of the curved frame member C, and is provided with an ear 300. A coil spring 301 is held in tension between the ear 300, and a bracket 302 secured to the frame member C, to urge the stop lever 299 in a clockwise direction from the position of Fig. 29, to position a stud 304 threaded into the outer end of the lever 299 in the path of movement of a stop plate 171 carried by the boom D (see Fig. 15).

A second similar stop lever 305 may be similarly mounted on the beam C, and is connected to the stop lever 299 by means of a link 306.

The impact of the plate 171 against either of the levers 299 or 305 causes the bell-crank lever 291 to pivot counterclockwise, thereby thrusting the rod 294 downwardly and restoring the clutch lever 289 to a neutral position. In case the operator wishes to continue the upward travel of the boom, in spite of the action of the intermediate stop levers 299 or 305, he can manually hold the lever 289 with a force sufficient to overcome the pressure of the spring 296.

A somewhat similar de-clutching arrangement is provided to restore the clutch to neutral when the boom reaches its downward normal limit of movement (see Figs. 1, 15 and 23). A rod 307 is inserted through an opening in the T lever 113, and is surrounded with a coil spring 308 similar to the coil spring 296. A cord 309 is connected to the lower end of the rod 307, and passes around suitable idler pulleys to a stop lever 310. The lever 310 projects into the path of movement of a block 311 mounted on the forward face of the boom guide frame 168 (see Fig. 15). The action of the block 311 on the stop lever 310 creates a tension on the cord 309 acting through the coil spring 308 to restore the T lever 113 and associated parts to neutral. When it is necessary or desirable to lower the boom further, the operator can hold the clutch in operating position by exerting sufficient force on the lever 289 to overcome the thrust of the coil spring 308.

Front wheel and frame

A front wheel and frame assembly, best illustrated in Fig. 23, preferably is made in the form of a drum or roller 314. This form of wheel insures that the load will be distributed over a large area, which assists in supporting the load when working in soft ground. The front wheel structure comprises a center tube 315, see Fig. 23, with a pair of discs 316 and 317 welded thereto. The peripheries of these discs are welded to the drum 314. A shaft or axle 318 supports the wheel by means of a pair of ball bearings 319.

The shaft 318 is mounted in a pair of brackets 320 and 321 which are secured to a transverse front frame member 322. The frame member 322 is bolted to the tractor frame members 323 and 324.

A pair of boom guide plates 325 and 326 are secured to the outer ends of the front frame to extend downwardly therefrom and are curved inwardly at their lower ends. The outer faces of the plates 325 and 326 are co-extensive with the outer faces of the curved frame members C, so that guide plates 169, secured to extend upwardly from the inner faces of the boom box frames 168 will have slidable contact with the outer faces of the guide plates 325 and 326, even though the boom should be lowered somewhat below the position illustrated in solid lines in Fig. 1.

In case it should be desirable, in certain types of excavating work, to lower the boom to a degree where the upper ends of the guide plates 169 would be below the lower ends of the guide plates 325 and 326, the curved ends of both sets of guide plates would tend to cam the boom back into alignment as it was raised, thereby effectively to extend the lower operating limit of the boom.

The pivotal mounting for the boom and the center of gravity of the entire assembly is arranged so that when the boom is in a load-transporting position, the center of gravity will be substantially normal to that of the tractor without the loading and material moving mechanism comprising the present invention.

The drum or roller 314 thus comes into use only when the bucket is being loaded, or is loaded, and is in a full forward position, the roller being mounted so as to be normally a distance of three or four inches from the ground when the tractor is in a level position.

*Modified bucket and bulldozer mounting bracket*

In some types of work the forward dumping feature of the bucket is unnecessary, and may be undesirable. Since the forward dumping mechanism entails additional expense, and the mechanism requires maintenance, an alternate form of bucket support is illustrated in Fig. 32. The use of this same support mechanism in mounting a bulldozer is illustrated in Figs. 33 and 34 of Plate II.

The bucket F, which may be the same type of bucket illustrated in Figs. 17 and 18, is mounted on the boom by means of the standard pivot pin 191. A cylindrical, internally threaded, link member 327 is connected by means of the pin 197 to the boom lug 192. A screw 328 is threaded into the member 327. The upper end of the screw 328 has a transverse opening therein to receive the pin 200, by means of which the screw is secured to the web 201 of the bucket F. A conventional grease fitting 329 is provided for lubricating the screw 328.

In order to mount a bulldozer on the boom D by means of the same mounting arrangement as that illustrated in Fig. 32 for mounting the bucket F, a bulldozer is constructed as illustrated in Figs. 33 and 34.

A curved blade 340 has a pair of oppositely disposed reinforcing angles 341 and 342, curved to conform thereto, secured to the rear face of the blade 340 adjacent to each end thereof. A replaceable blade edge member 343 is bolted to the lower edge of the blade 340. The angle iron members 341 and 342 are spaced apart a sufficient distance, as illustrated in Fig. 34, to receive the ends of the screws 328 between these members, the screws being fastened to the members 341 and 342 by means of the pins 200. The bucket support members 178, carried by the boom D, are mounted between the angle iron members 341 and 342, and are pivotally connected to these angle iron members by means of the pins 191.

A shoe 344 is connected at its forward end, by means of a pivot pin 345, to a bracket 346 secured to the rear face of the blade 340, the rear end of the shoe 344 being connected by means of a link 347 to a perforated plate 348 carried by the bracket 346. The upper end of the link 347 is connected by means of a bolt 349 to any one of a number of holes in the plate 348, so that the angular position of the shoe 344 can be adjusted with respect to the bracket 346. In this manner the blade of the bulldozer may be vertically adjusted to regulate the depth of the cut.

The mounting arrangement of the internally threaded member 327 on the lug 192 is similar to that described for the same parts when used for mounting the bucket F as illustrated in Fig. 32.

*Modified brake and clutch control*

In the modified structure shown in Figs. 35, 36, 37 and 38, a spring-loaded brake is provided for the winch drum, the brake being arranged for automatic operation in conjunction with the clutch control lever. Automatic limit controls are also provided to move the clutch control lever to a neutral position, with the consequent application of the winch drum brake, when the boom reaches a maximum desired raised or lowered position.

Since the brake and control mechanism illustrated in Figs. 35, 36, 37 and 38 are adapted to be applied to the general type of loading apparatus previously described herein, the same numerals will be employed for the various parts of the present loading mechanism and the tractor as have been used for these parts up to this point in the specification.

In the illustration of Fig. 37, the winch drum 142 is provided with a braking area 350 around which is mounted a brake band 351. The brake band 351 is preferably of steel strap construction, with a lining 352 (see Fig. 36), which may be of suitable asbestos brake band material. One end of the steel brake band 351 has a threaded stud 353 welded thereto, the stud 353 being mounted in a bracket 354 in which it is secured adjustably by nuts 355 and 356. The other end of the brake band 351 from that secured to the bracket 354, is provided with a strap fitting 351' which receives a pin 357. The pin 357 is pivotally mounted in a lever 358 which is keyed to a rock shaft 359, and is secured in position thereon by means of a bolt 360. One end of the rock shaft 359 is pivotally mounted in the bracket 354, the other end of the rock shaft being pivotally mounted in the bracket 361. The rock shaft 359 is secured against endwise movement in the brackets in which it is mounted by means of collars 362 and 363 which are secured in position by conventional set screws.

A sleeve 364, see Fig. 37, is keyed to the rock shaft 359, and is provided with a laterally extending cam lever 365, having a notch 366 substantially in the center of its arcuate upper edge, see Figs. 36 and 38. The sleeve 364 is also provided with a downwardly extending lever arm 367, which is provided with an opening to receive the hooked end of a powerful coil spring 368.

The other end of the coil spring 368 is hooked into the eye of an eye-bolt 369 which is adjustably mounted in an arm 370 of the bracket 361, and is secured in position thereon by means of nuts 371 and 372. The coil spring 368 acts normally to hold the brake band 351 and its associated lining 352 in braking engagement with the braking surface 350 of the winch drum 142.

A brake release cam lever 373 is pivotally mounted on a bolt 374, which in turn is mounted in an opening in the bracket 361. The concave lower edge 375 of the cam lever 373 is positioned directly over the arcuately curved upper face of the brake release lever 365, and is spaced therefrom in the neutral position of the cam lever as illustrated in Fig. 36.

The upper end of the cam lever 373 is connected by means of an adjustable link 377 to the upper end of a lever 378, which is keyed to a rock shaft 379, one end of which is mounted in a bracket 385 (see Fig. 35) and the other end of which is mounted in a bearing recess, not shown, in the side of the clutch housing H. The upper end of the lever 378 is also connected by means of an adjustable link 380 to the clutch control lever 289.

A lever 381 is keyed to the opposite end of the rock shaft 379 from that to which the lever 378 is keyed, and a link 382 is pivotally connected from the upper end of the lever 381, to the arm 383 of a bell-crank lever 384. The bell-crank lever 384 is keyed to the clutch operating shaft 112.

The mechanism up to this point comprises a combined clutch operating and automatic drum braking mechanism which operates as follows:

*Operation of brake and clutch control*

When the clutch control lever 289 is moved forwardly, or clockwise, from the position illustrated in Fig. 35, the link 380 will be moved to the right, thereby rocking the lever 378 to which it is connected, in a clockwise direction from the position illustrated. The movement of the lever 378 in turn rocks the shaft 379, to which the lever 378 is keyed, in a clockwise direction, and swings the lever 381, also keyed to the shaft 379, in a clockwise direction. The link 382, which is pivotally connected to the upper end of the lever 381 is thereby moved to the right from the position illustrated, rocking the arm 383 of the bell-crank lever 384 in a counterclockwise direction. The bell-crank lever 384, being keyed to the clutch shaft 112, moves the clutch mechanism in a manner previously described to cause a lowering of the boom D. As the link 380 moves toward the right from the position illustrated in Figs. 35 and 36 during a clockwise operating movement of the clutch operating lever 289, as above described, the adjustable link 377 will also be moved to the right from the position illustrated in Fig. 35, thereby moving the cam lever 373 pivotally in a clockwise direction, and moving the lower right-hand nose 387 of the cam lever across the arcuate upper face of the brake releasing lever 365, and setting the nose 387 in the notch 366 in the center of the upper edge of the lever 365, as illustrated in Fig. 38. This action of the cam lever depresses the lever 365, moving it pivotally in a clockwise direction, and with it the shaft 359 to which this lever is keyed, moving the parts from the positions illustrated in Fig. 36, to that illustrated in Fig. 38. This action of the rock shaft 359 moves the lever 358, which also is keyed to the shaft 359, in a clockwise direction from the position illustrated in Fig. 36, thereby releasing the brake band 351, and permitting a free rotation of the winch drum 142.

A movement of the clutch control lever 289 rearwardly, or in a counterclockwise direction from the position illustrated in Fig. 35, will move each of the associated parts in a direction opposite to that described for the forward operation of the lever 289. Such movement will swing the bell-crank lever 384 in a clockwise direction to move the clutch to a boom-raising position, and will swing the cam lever 373 in a counterclockwise direction to release the brake. Since the movements of the various parts are the reverse of that above described for the lowering of the boom, it will be unnecessary to describe in detail the movement of each of these parts for such opposite movement of the clutch control lever.

*Modified boom-controlled clutch throw-out mechanism*

In order to limit the maximum downward movement of the boom, and at the same time automatically to release the clutch and apply the brake to the winch drum when the downward travel of the boom is stopped, by means other than the operating lever 289 and its associated mechanism, automatic clutch and brake control mechanism is provided as is illustrated in Fig. 35.

This mechanism includes an adjustable link 389 which is connected to an arm 390 of the bell-crank lever 384, the upper end of the link 389 being pivoted to a T lever 391, which is pivotally mounted on a bracket 393 secured to the arcuate frame member C. The opposite end of the T lever 391 is provided with a cam face 392, which, in the neutral position of the operating lever 289, is in the solid-line position illustrated in Fig. 35.

An arm 394 of the T lever 391 is pivotally connected at its lower end to an adjustable link 395, the rear end of said link being connected to an arm 396 of a bell-crank lever 397.

A second arm 398, of the bell-crank lever 397, is mounted in the path of movement of a cam 399, which is secured to the yoke 254 which carries the cable slack take-up pulley 230. When the cable 148 is taut, as illustrated in Fig. 35, the yoke 254 will be in its maximum position of counterclockwise rotation, as illustrated in dotted lines in Fig. 35, thereby moving the cam 399, secured to the yoke 254, out of engagement with the arm 398 of the bell-crank lever 397, and permitting the arm 398 to swing upwardly into the uppermost dotted-line position of the arm 398, illustrated in Fig. 35.

*Operation of the boom-controlled clutch throw-out mechanism*

The operation of the automatic clutch throw-out mechanism is as follows: When the clutch control lever 289 is moved rearwardly or in a counterclockwise direction from the position illustrated in Fig. 35, the bell-crank lever 384, which is keyed to the clutch shaft 112 will be moved pivotally in a clockwise direction to move the clutch to a boom-raising position, as previously described. This movement of the bell-crank lever 384 draws the adjustable link 389 downwardly and swings the T lever 391 pivotally in a clockwise direction, so that the cam face 392 will be moved to the uppermost dotted-line position illustrated. In this position, the cam face 392 will lie in the path of movement of a plate, not illustrated, such as the plate 171, see Fig. 15, carried by the box-like extension 168 of the boom D. As the boom reaches the upper end of its travel and engages the cushioning plunger 331, the action of the boom-carried element on the cam face 392 moves the T lever 391 counterclockwise to the solid-line position illustrated in Fig. 35, thereby restoring the clutch to neutral, and applying the brake in the manner previously described for such neutral position.

It will be apparent that the clutch control lever 289 will be free for clockwise or forward movement upon such restoration of the parts to normal by the action of the boom-carried element upon the cam face 392, since such forward or clockwise movement of the operating lever 289 will move the T lever 391 still further in a counterclockwise direction, bringing the arm having the cam face 392 thereon to the lowermost dotted-line position of Fig. 35.

The operation of the arresting mechanism to release the clutch and apply the brake when the boom reaches its downward limit of travel is as follows: During either an upward or downward movement of the boom, as well as when the boom is at rest and supported by the cables 148 and 154, the weight of the boom and its associated parts maintains the cables 148 and 154 under tension, thereby holding the slack take-up mechanism, including the pulley 230 and the yoke 254 in the dotted-line positions illustrated in Fig. 35. In this dotted-line position of the cable slack take-up mechanism, the cam 399 is held upwardly out of contact with the cam face of the arm 398.

When the boom D reaches its downward limit of travel, as when resting upon the ground, as illustrated in solid lines in Fig. 1, the cables 148 and 154 are relieved from tension, and the yoke 254 is swung in a clockwise direction by the action of the coil springs 250, see Fig. 20, thereby swinging the yoke 254 to the solid-line position of Fig. 35. This action of the yoke 254 swings the cam 399 across the cam face of the arm 398, forcing the arm 398 downwardly to the solid-line position illustrated. This action swings the bellcrank lever 397 in a clockwise direction, and through the action of the link 395, similarly swings the T lever 391 to the solid-line position of Fig. 35, thereby to restore the clutch to a neutral position, and to release the brake for application by means of the brake spring 368, as previously described.

While I have illustrated and described these specific embodiments of my invention, I contemplate that many changes and substitutions may be made therein without departing from the scope or spirit of my invention.

I claim:

1. In a material handling and loading apparatus comprising, a tractor, a boom pivotally supported on the tractor, a winch mounted on the tractor, the winch having a plurality of pin-receiving openings parallel to and eccentric of the winch axis, a line leading from the winch to the boom, to raise and lower the boom, and power drive means including a drive shaft mounted in axial alignment with and alongside of said winch; a hub keyed to the drive shaft and having a plurality of pin-receiving openings therein adapted to register with said openings in the winch, and a plurality of drive pins inserted in the openings in the drum and extending into the openings in the hub to provide a driving connection between the winch and the drive shaft.

2. In a material handling and loading apparatus comprising, a tractor, a boom pivotally supported on the tractor, a winch drum mounted on the tractor, and a cable operatively connecting the boom and drum, said drum having a tapered opening to receive an end portion of the cable introduced into the opening through the small end thereof; a tapered cable clamp member insertable in said opening, and force exerting means acting endwise of the tapered member and adapted to engage the drum to draw the tapered member into the opening and grip the cable end between the tapered member and a side of the tapered opening.

3. In a material handling and loading apparatus comprising, a tractor, a boom pivotally supported on the tractor, a winch drum mounted on the tractor, and a cable operatively connecting the boom and drum, said drum having a cable winding portion; a pair of divergent members adjacent the cable winding portion adapted to receive an end of the cable therebetween, a clamp member insertible between the divergent members to have one side thereof in slidable contact with one of said divergent members, and to have an opposite side thereof in contact with a cable positioned between said clamp member and the other of said divergent members, and force-multiplying means mounted to force the clamp member endwise of the divergent members and grip a cable end between the clamp member and said other divergent member.

4. In a material handling and loading apparatus, comprising a track type tractor, a pair of pivot mounts secured one to each side of the tractor, and a yoked boom having its legs pivotally mounted one on each of said mounts to swing outwardly of the tractor tracks; an inwardly offset guide member carried by each of said boom legs, lateral guide tracks secured to the tractor inwardly of the tractor tracks and curving upwardly and rearwardly from the front end of the tractor to have guiding contact with said boom guide members, a material moving member mounted on the boom, and power drive means operatively connected to the boom to move the boom and the material moving member about said pivot mounts as an axis.

5. In a material handling and loading apparatus, comprising a tractor, a pair of pivot mounts removably secured one on each outer side of the tractor, and a boom having a pair of boom legs pivotally mounted one on each of said mounts; a guide member carried by each of said boom legs, a guide track secured to the tractor inwardly of the outer sides thereof, said track curving upwardly and rearwardly from the front end of the tractor to have lateral guiding contact with said guide member, a material moving member mounted on the boom, and controlled power drive means having operative connection with the boom to move the boom and the material moving member about said pivot mounts as an axis.

6. Material handling and loading apparatus comprising in combination with a tractor, a pair of substantially parallel frame members secured to the tractor and curving upwardly and rearwardly from the front end of the tractor, a detachable boom comprising a pair of parallel legs pivotally supported on the tractor substantially concentrically with the curvature of said frame members, guide means carried by the boom and bearing on the frame members to guide the boom in a vertical plane parallel to the guide members, and controlled power drive means having operative connection with the boom, to move the boom about its pivotal supports as an axis, the boom legs lying without, and the frame members lying within, the over-all width of the tractor, whereby upon detaching the boom the over-all width is reduced to that of the tractor without removing the frame members.

7. In a material handling and loading apparatus, comprising a tractor, a winch mounted on the tractor, a pair of pivot mounts secured one to each side of the tractor, and a boom leg pivoted on each of said mounts; each leg having an offset portion extending laterally toward the other leg, a pair of guide tracks secured to the tractor and curving upwardly and rearwardly from the front end of the tractor substantially concentrically with the pivotal center of said legs, said guide tracks being positioned to have guiding contact with the offset portions of said legs, and a cable leading from said winch to said legs, and adapted to be wound on said winch to operate said legs about their pivot mounts as an axis.

8. In a material handling and moving apparatus, the combination including a tractor, a winch mounted on the tractor, a boom pivotally supported on the tractor, a cable leading from the winch to the boom, a bucket pivotally mounted on the outer end of the boom with its axis parallel to the boom axis, the axis of pivotal mounting of the bucket being materially inward from the center of gravity of the bucket; a latch support mounted on the boom, and releasable latch means mounted on the latch support to latch the bucket in load carrying position, the latch support being adjustable with respect to the boom to vary the latched position of the bucket.

9. In a material handling and moving apparatus, the combination including a tractor, a boom pivotally supported on the tractor, power actuated means for operating said boom, and a bucket pivotally mounted on the outer end of the boom, the axis of the bucket mounting being offset in a direction longitudinally of the boom from the center of gravity of the bucket; a latch plate pivotally mounted concentrically with the axis of the bucket mounting, a latch pivotally mounted on the latch plate to latch the bucket in load carrying position, a spring mounted to urge the latch to latching position, manually operable release means connected to the latch to withdraw it from latching position to free the bucket for movement to load dumping position, and means adjustably securing the latch plate to the boom to adjust the angular position of the bucket latch with respect to the axis of the bucket mounting.

10. In a material handling and loading apparatus, comprising a tractor, a boom pivotally supported on the tractor, and power actuated means for operating said boom, and a bucket pivotally mounted on the outer end of the boom to have a latched load carrying position, and a released forward dumping position; a latch mounted on the boom to latch said bucket in load carrying position, a spring-held reel mounted on the tractor adjacent an operator's position on the tractor, a line leading from the reel to the latch to be held in resilient tension less than that required to release said latch, normally to draw in slack and pay out line on an operation of the boom to move the latch successively nearer and farther from the reel, and a manually operated catch mounted adjacent the reel and normally out of engagement therewith, said catch being moved on an operation thereof to engage said reel and wind the line toward the reel to release said latch.

11. In a material handling and loading apparatus, the combination including a tractor, a boom pivotally supported on the tractor, and power actuated means for operating said boom; a bucket pivotally mounted on the outer end of the boom to have a latched load carrying position, and a released forward dumping position, a latch mounted on the boom to latch said bucket in load carrying position, a spring-held reel mounted on the tractor adjacent an operator's position on the tractor, a line leading from the reel to the latch to be held in resilient tension less than that required to release said latch, normally to draw in slack and pay out line on an operation of the boom to move the latch successively nearer and farther from the reel, a ratchet secured to said reel to rotate therewith, a pawl support pivoted concentrically with the ratchet, a pawl pivoted on the pawl support adjacent the ratchet and normally free from engagement therewith, and a latch release operating handle carried by the pawl to move the pawl into engagement with the latch on an initial operative movement of said handle, and to operate said reel and wind the line toward the reel to release the latch on a continued movement of said operating handle.

12. In a material handling and loading apparatus, comprising a tractor, a boom pivotally supported on the tractor, power actuated means for operating said boom, and a bucket pivotally mounted on the outer end of the boom to have a latched load carrying position, and a released forward dumping position; a pair of latches carried by the boom in laterally spaced relation to, and free from lateral intermediate connection with each other, a line connected from each of said latches to a point adjacent an operator's position on the tractor, spring means associated with said lines to exert a normal tension on said lines less than the tension required to operate said latches during successive increases and decreases of the effective lengths of said lines, and a latch operating member mounted, on an operation thereof, to engage said lines simultaneously to increase the tension on said lines to operate said latches simultaneously.

13. In a material handling and moving apparatus, comprising a tractor, a winch mounted on the tractor, a boom pivotally supported on the tractor, and a cable leading from the winch to the boom; slack take-up means proximately associated with the winch comprising an idler pulley mounted between the winch and the boom to support the cable, a movable take-up pulley mounted adjacent to the idler pulley, and resilient means associated with the movable pulley to flex the cable toward the idler pulley, thereby to increase the length of cable between the winch and the boom, said resilient means exerting a force on the take-up pulley less than the force exerted on the take-up pulley by the cable under a boom load.

14. In a material handling and moving apparatus, comprising a tractor, a winch mounted on the tractor, a boom pivotally supported on the tractor, and a cable leading from the winch to the boom; slack take-up means comprising a pair of cable support idler pulleys spaced apart and supporting the cable, a yoke mounted concentrically with one of said idler pulleys, a slack take-up idler pulley mounted on an outer end of the yoke to roll on the cable between the idler pulleys, and a spring adjustably connected to the yoke to urge the yoke-mounted idler between the cable-support idlers to increase the cable length between said cable-support idler pulleys on the occurrence of slack in said cable.

15. In a material handling and loading apparatus, comprising a tractor, a winch mounted on the tractor, and a boom pivotally supported on the tractor; a cable storage reel mounted on the tractor, a sheave swiveled on an outer portion of the boom, a cable leading from the winch, around the sheave, and thence to the storage reel, a reserve supply of the cable being wound on the reel, and a cable anchor mounted to receive the cable between the sheave and the storage reel, said anchor being secured to a tractor member to resist tensional cable load stresses.

16. In a material handling and loading apparatus, comprising a tractor, a winch mounted on the tractor, and a boom pivotally supported on the tractor; a pair of cable storage reels mounted on the tractor, a pair of sheaves mounted on the outer portion of the boom, a pair of cables leading from the winch, each of said cables passing around one of said sheaves, and thence to a storage reel, a pair of anchor members, each mounted to receive a cable between a sheave and a storage reel, and cable clamp means secured to said cables between the anchors and the storage reels to secure the cables to each other.

17. In a material handling and loading apparatus, comprising a tractor, a winch mounted on the tractor, and a boom pivotally supported on the tractor; a pair of cable storage holders mounted on the tractor, a pair of sheaves mounted on the outer portion of the boom, a pair of cables leading from the winch, each of said cables passing around one of said sheaves, and thence to a cable storage holder, a pair of cable anchors, each mounted to receive a cable between a sheave and a storage reel, and clamp means secured to said cables between the anchors and the storage reels to secure the cables to each other, the clamp means being otherwise free to permit endwise adjustment of said cables through the anchors for initially equalizing tensional stresses between said cables, and secondary clamp means secured to said cables to prevent shifting of said cables under unbalanced operative stresses.

18. A material moving and handling apparatus including a tractor, a boom having a pair of legs pivotally mounted one on each side of the tractor, a boom cable, a power winch for the cable for raising and lowering the boom, a control member having operative and neutral positions operatively connected to the power winch, spring pressed means engaging the cable to take up slack therein, and a connection between said slack take-up means and said control means operating, on operation of said slack take-up means, to move the control member to neutral position.

19. Material moving and handling apparatus including a tractor, a boom having a pair of legs pivotally mounted one on each side of the tractor, power actuated means for raising and lowering the boom, a control member having operative and neutral positions operatively connected to the power actuated means, a normally actuated brake on said power actuated means, brake release means connected to said control member to be operated on movement of said control member to an operative position, a cam lever mounted in the path of movement of the boom, and means interconnecting the control member and the cam lever to move the control member to neutral position on actuation of the cam lever by the boom.

20. A material moving and handling apparatus, including a tractor, a boom having a pair of legs pivotally mounted one on each side of the tractor, a bucket pivotally mounted on the outer end of the boom to have its axis parallel to the axis of the boom, a boom cable, a power winch for the cable for raising and lowering the boom, said boom and its supported bucket having a lowermost digging position, an uppermost rearward dumping position, a forward dumping position, and an intermediate carrying position, a control member having operative and neutral positions operatively connected to the power winch, a cam lever mounted in the path of movement of the boom at each of the forward dumping intermediate carrying, and uppermost rearward dumping positions to be operated by an upward movement of the boom into engagement with any of said cam levers, a fourth cam lever mounted in the path of movement of the boom at a lowermost point of travel of said boom to be operated by a downward movement of the boom into engagement with said lowermost cam lever, and a connection between each of said cam levers and said control lever to be actuated on operation of each of said cam levers to move the control member to neutral position.

21. A material moving and handling apparatus, including a tractor, a boom having a pair of legs pivotally mounted one on each side of the tractor, a bucket pivotally mounted on the outer end of the boom to have its axis parallel to the axis of the boom, a boom cable, a power winch for the cable for raising and lowering the boom, said boom and its supported bucket having a lowermost digging position, an uppermost rearward dumping position, a forward dumping position, and an intermediate carrying position, a control member having operative and neutral positions operatively connected to the power winch, a cam lever mounted in the path of movement of the boom at each of the forward dumping intermediate carrying, and uppermost rearward dumping positions to be operated by an upward movement of the boom into engagement with any of said cam levers, a fourth cam lever mounted in the path of movement of the boom at a lowermost point of travel of said boom to be operated by a downward movement of the boom into engagement with said lowermost cam lever, a connection between each of said cam levers and said control lever to be actuated on operation of each of said cam levers to move the control member to neutral position, and releasable means between the control member and said boom operated cam-levers to permit operation of said control member after a movement of the control member to neutral by engagement of the boom with any of said cam-levers, to continue movement of the boom in the same direction as when the control member was thus moved to neutral.

22. In a material moving and handling apparatus, including a tractor having a body, a boom pivotally mounted on the tractor, a winch mounted on the rear of the tractor, a cable leading from the winch to the boom, and a clutch-controlled transmission mechanism mounted adjacent the winch and having controlled driving connection therewith; a universally jointed drive shaft leading from the transmission mechanism forwardly to a point beside and forwardly of the tractor body, an elongated shallow gear housing applied to the front of the tractor, and having the forward end of said drive shaft journaled therein, a gear mounted on the forward end of the drive shaft, an engine-driven shaft projecting forwardly from the tractor engine substantially centrally of the tractor body, and having the forward end thereof journaled in the elongated shallow gear housing, a drive gear secured to the forward end of the engine-driven shaft and substantially co-planar with the gear on the forward end of the drive shaft, and a plurality of successively intermeshed gears mounted in said gear housing and constituting a driving connection between the drive gear on the engine-driven shaft and the gear on the front end elongated drive shaft extending forwardly from said transmission mechanism.

22. Material moving and handling apparatus, including a tractor having a body, a boom pivotally mounted on the tractor, a winch mounted on the rear of the tractor, a cable leading from the winch to the boom, a clutch-controlled transmission mechanism mounted adjacent the winch and having controlled driving connection therewith, a universally jointed drive shaft leading from the transmission mechanism forwardly to a point beside and forwardly of the tractor body, an elongated shallow gear housing applied to the front of the tractor, and having the forward end of said drive shaft journaled therein, a gear mounted on the forward end of the drive shaft, an engine-driven shaft projecting forwardly from the tractor engine substantially centrally of the tractor body, and having the forward end thereof journaled in the elongated shallow gear housing, a clutch mounted in said gear housing, and constituting clutch engagement between the tractor engine and said engine-driven shaft, and a plurality of successively intermeshed gears mounted in said gear housing and constituting a driving connection between the engine-driven shaft and the elongated drive shaft extending forwardly from said transmission mechanism.

24. Material handling and loading apparatus comprising in combination with a tractor, a winch mounted on the tractor, a boom operating mechanism framework therefore mounted on the tractor to lie wholly between the sides of said tractor, a yoked boom comprising a pair of parallel legs pivotally supported on the tractor exteriorly of the sides of said tractor, and a cable leading from the winch to the boom to move the boom about its pivotal supports as an axis, said boom being readily removable to leave the remainder of the tractor supported structure wholly within the overall width of said tractor

JOSEPH KUCHAR.